United States Patent
Jongsma et al.

(10) Patent No.: US 12,359,914 B2
(45) Date of Patent: Jul. 15, 2025

(54) APPARATUS, METHOD AND SYSTEM FOR MEASURING LOCATIONS ON AN OBJECT

(71) Applicant: FNV IP B.V., Leidschendam (NL)

(72) Inventors: Arnoud Marc Jongsma, Leidschendam (NL); Dennis van Weeren, Leidschendam (NL); Mario Josephus De Bijl, Leidschendam (NL)

(73) Assignee: FNV IP B.V., Leidschendam (NL)

( * ) Notice: Subject to any disclaimer, the term of this patent is extended or adjusted under 35 U.S.C. 154(b) by 303 days.

(21) Appl. No.: 17/800,564

(22) PCT Filed: Feb. 18, 2021

(86) PCT No.: PCT/NL2021/050104
§ 371 (c)(1),
(2) Date: Aug. 18, 2022

(87) PCT Pub. No.: WO2021/167452
PCT Pub. Date: Aug. 26, 2021

(65) Prior Publication Data
US 2023/0088410 A1    Mar. 23, 2023

(30) Foreign Application Priority Data

Feb. 21, 2020   (NL) ..................... 2024966

(51) Int. Cl.
*G01C 11/02* (2006.01)
*G06T 7/73* (2017.01)
*H04N 23/56* (2023.01)

(52) U.S. Cl.
CPC ............ *G01C 11/02* (2013.01); *G06T 7/74* (2017.01); *H04N 23/56* (2023.01)

(58) Field of Classification Search
CPC ........... G01C 11/02; G06T 7/74; H04N 23/56
See application file for complete search history.

(56) References Cited

U.S. PATENT DOCUMENTS

| | | | |
|---|---|---|---|
| 5,541,726 A | 7/1996 | Nakajima | |
| 8,427,632 B1 * | 4/2013 | Nash | G01C 3/08 348/136 |

(Continued)

FOREIGN PATENT DOCUMENTS

| | | |
|---|---|---|
| CN | 101153913 A | 4/2008 |
| CN | 102341671 B | 2/2012 |

(Continued)

OTHER PUBLICATIONS

Turyshev et al., "Corner-cube retro-reflector instrument for advanced lunar laser ranging." Experimental Astronomy 36 (2013): 105-135, Nov. 2012 (Year: 2012).*

(Continued)

*Primary Examiner* — Oneal R Mistry
*Assistant Examiner* — Nhut Huy Pham
(74) *Attorney, Agent, or Firm* — Polsinelli PC

(57) ABSTRACT

A system for monitoring survey reflectors arranged at a plurality of locations on an object, having:
  a camera, including:
    one or more light sources arranged to illuminate a field in space corresponding to at least 10% of a field of view of the camera, preferably the whole field of view;
    an image sensor receiving light beams from reflections of the beam by the survey reflectors and providing data;
    a body with an optical entry system, the image sensor located on a first side and the light source on a second side of the body;
  and
  a processing unit processing the data.
The processing unit is configured to determine locations of the survey reflectors from the image sensor data and detect (Continued)

movement of the survey reflectors based on a comparison of the determined locations with previously determined locations.

27 Claims, 18 Drawing Sheets

(56) References Cited

U.S. PATENT DOCUMENTS

| | | | |
|---|---|---|---|
| 8,567,076 | B2 | 10/2013 | Ortleb et al. |
| 2008/0100821 | A1* | 5/2008 | Yabe .................... G01C 15/002 356/3.1 |
| 2011/0211063 | A1* | 9/2011 | Kludas ................. G01C 15/002 382/106 |
| 2012/0008136 | A1* | 1/2012 | Jaeger ................. G01C 15/002 356/138 |
| 2012/0327271 | A1* | 12/2012 | Nordenfelt ........... G01C 15/002 348/239 |
| 2014/0253781 | A1 | 9/2014 | Gill et al. |
| 2016/0091639 | A1 | 3/2016 | Winter et al. |
| 2019/0146089 | A1 | 5/2019 | Nagalla et al. |
| 2020/0124730 | A1* | 4/2020 | Vogel .................... G01C 11/06 |
| 2020/0355499 | A1* | 11/2020 | Hinderling ............... G01C 1/04 |

FOREIGN PATENT DOCUMENTS

| | | | |
|---|---|---|---|
| CN | 102834694 | A | 12/2012 |
| CN | 103403575 | A | 11/2013 |
| CN | 105452806 | A | 3/2016 |
| EP | 1209486 | A2 | 5/2002 |
| EP | 3339803 | A1 | 6/2018 |
| JP | 2004261598 | | 9/2004 |
| JP | 2006302279 | A | 11/2006 |
| JP | 2008125619 | A | 6/2008 |
| JP | 2012103009 | A | 5/2012 |
| KR | 20160087128 | A * | 7/2016 ............... G01C 7/06 |
| WO | 2016137624 | A1 | 9/2016 |
| WO | 2019143249 | A1 | 7/2019 |
| WO | 2019143250 | A1 | 7/2019 |

OTHER PUBLICATIONS

Turyshev, Slava G., et al. "Corner-cube retro-reflector instrument for advanced lunar laser ranging." Experimental Astronomy 36 (2013): 105-135. (Year: 2013).*
Turyshev, S.G., Williams, J.G., Folkner, W.M., Gutt, G.M., Baran, R.T., Hein, R.C., Somawardhana, R.P., Lipa, J.A. and Wang, S., 2013. Corner-cube retro-reflector instrument for advanced lunar laser ranging. Experimental Astronomy, 36(1), pp. 105-135.
First Office Action for AE Application No. P6001621/2022, Dec. 11, 2024, 12 pages.
First Office Action for Canadian Application No. 3,168,220, dated Oct. 1, 2024, 5 pages.
First Office Action for Chinese Application No. 202180015845.6, dated Mar. 5, 2025, 11 pages.
First Office Action for Japanese Application No. 2022-547727, dated Dec. 11, 2024, 10 pages.
Oral Proceedings pursuant to Rule 115(1) EPC, EP Application No. 21-707-403.8, dated Dec. 12, 2024, 10 pages.
Turyshev, et al., "Corner-cube retro-reflector instrument for advanced lunar laser ranging," arXiv: 1210.7857v2 [PHYSICS.INS-DET] Nov. 1, 2012, 17 pages.

* cited by examiner

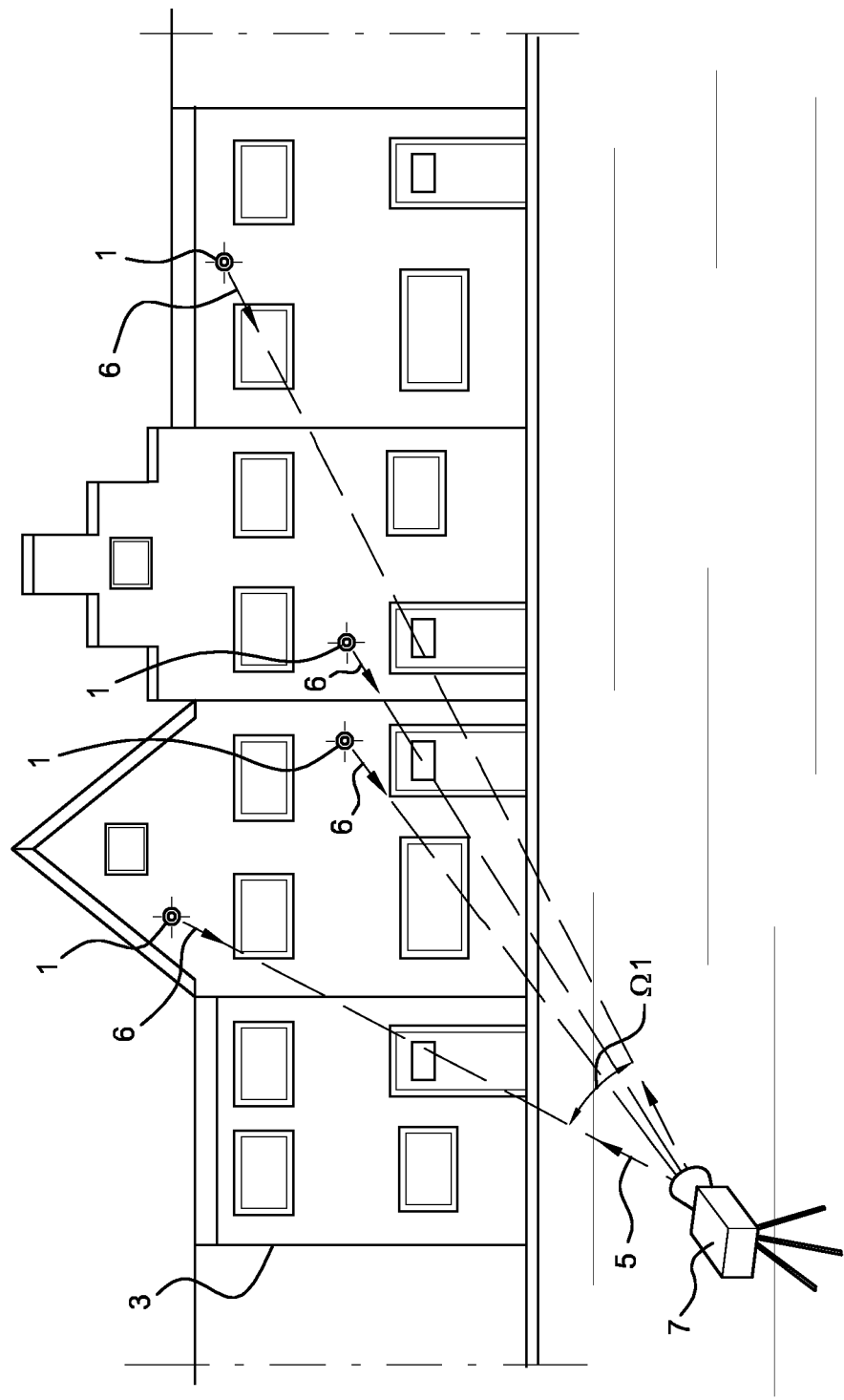

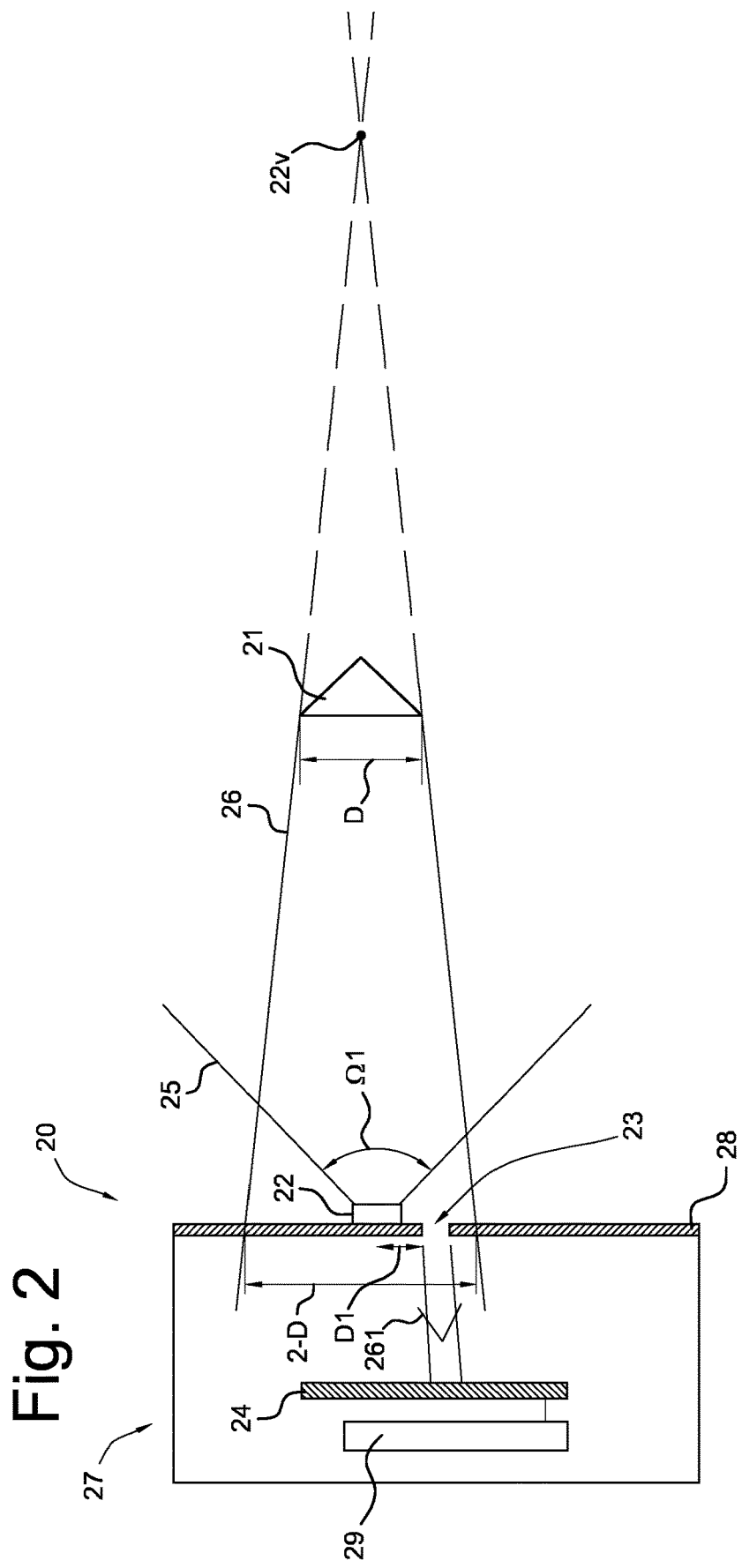

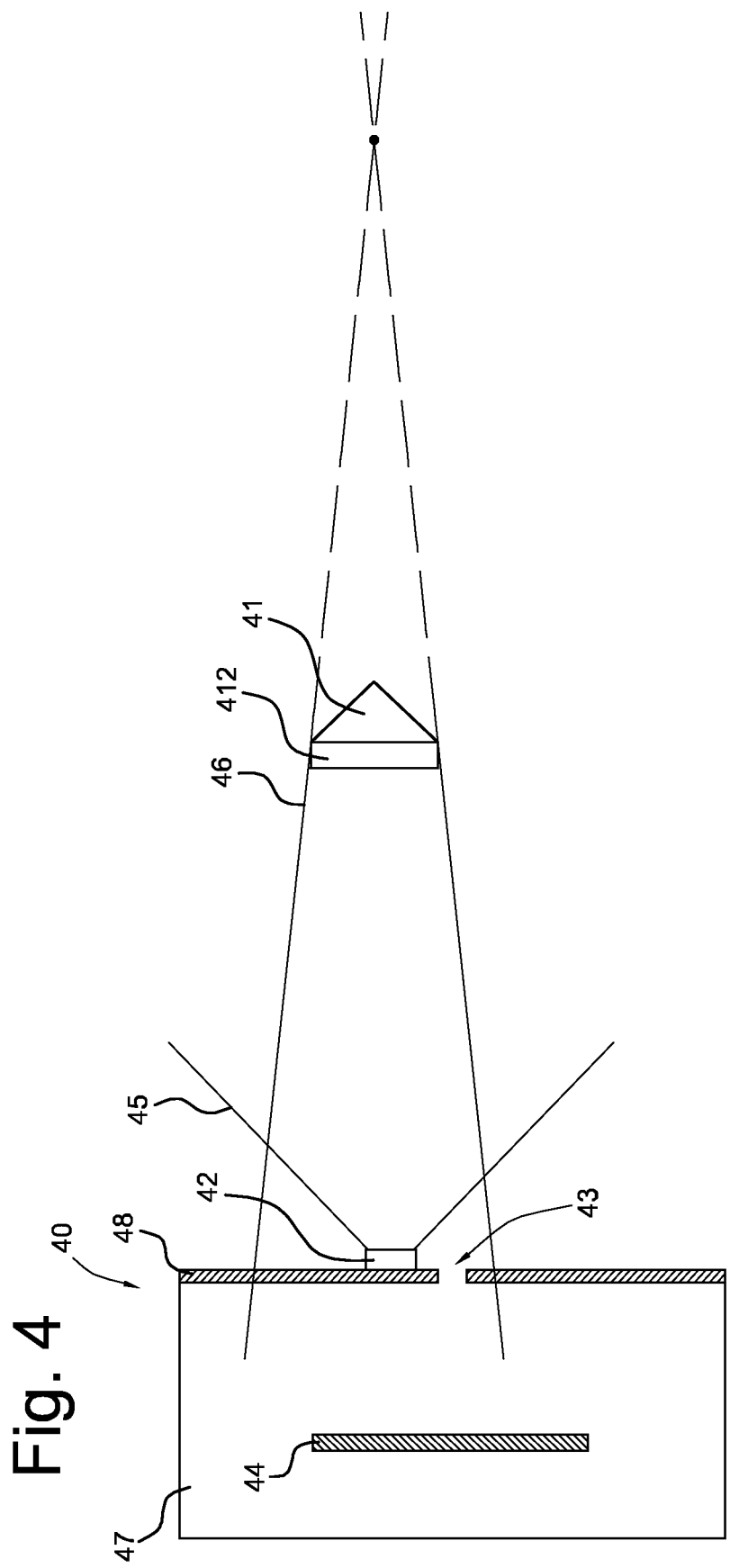

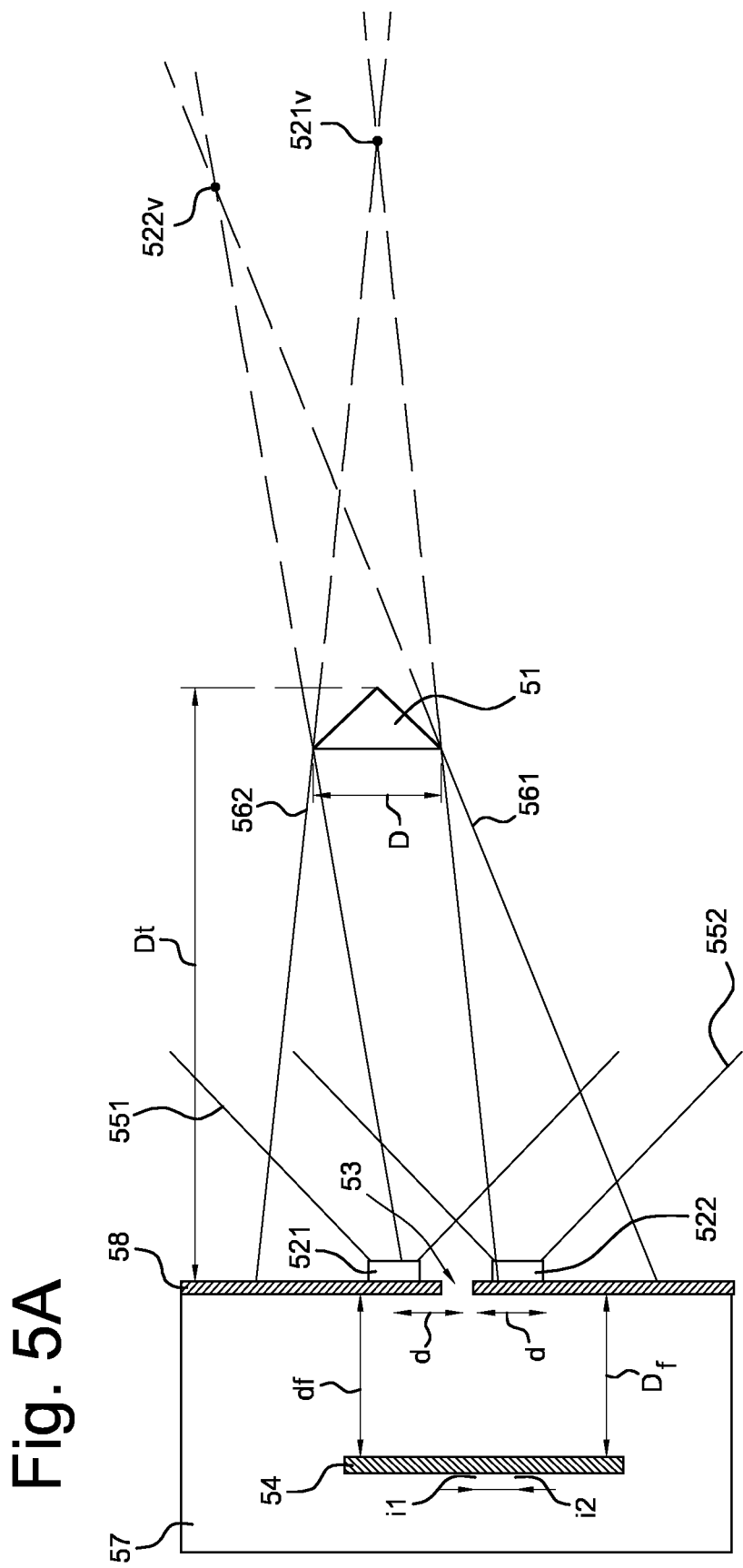

APPARATUS, METHOD AND SYSTEM FOR MEASURING LOCATIONS ON AN OBJECT

FIELD OF THE INVENTION

The present invention relates to a system and a method for monitoring locations on an object. The invention may further relate to an system and a method for monitoring and/or detecting movement of the object.

BACKGROUND ART

Systems and methods for measuring locations of remote objects are known for a long time, e.g. in the fields of surveying and/or monitoring of structures.

WO 2019/143249 A1 and WO 2019/143250 A1 disclose apparatuses and methods for monitoring locations of an object, e.g. a structure, over time. The disclosed systems comprise beacons using active light sources located at the locations to be measured. The publications present solutions for reducing influence of disturbing light sources, such as ambient light, and for efficient identification of the different beacons.

However, the active light sources require a power supply. For long term monitoring this may require using batteries, replace batteries or locally harvest energy (e.g. using a solar panel).

US 2018/0224527 A1 describes a coordinate measuring device for detecting a position of a target object which can move in space, the device having automatic target object recognition. The device however shows large complexity, and the measurement procedure would become rather time consuming when measuring a plurality of target objects.

U.S. Pat. No. 8,553,212 B2 describes a geodesic measurement system and method for identifying a target unit having a geodesic measurement device. The publication is focused on the identification of the target unit. However, if desiring to measure, and therefore identify, a plurality of target units, the procedure appears relatively time consuming.

SUMMARY OF THE INVENTION

The problem addressed by the present document is how to enable monitoring the location of an object over time. More specifically, the addressed problem relates to monitoring objects, like buildings, which should have a fixed position relative to the earth but move over time. Locations on the object may show a slowly changing position over time, and the object may even as a whole experience deformation. Causes may relate to soft ground on which the building stands, underground construction works below the building (e.g. to build an underground parking lot or subway), and earth quakes (e.g. caused by natural gas extraction from earth locations below the building).

More specifically, it is the objective of the present invention to overcome the shortcomings of the prior art, and to allow monitoring locations over time, while reducing the power consumption at the monitored, in particular remote, locations, while still providing efficient and reliable monitoring. In particular it is an object of the present invention to reduce the reliance on power sources at the monitored locations.

It is a further object of the present invention to enable more time efficient monitoring of locations on an object.

It is a further object of the present invention to reduce complexity of the system and/or method for monitoring locations on an object.

Accordingly, the present invention provides a system as defined in independent claim 1.

The invention also provides methods as claimed in further independent claims.

Advantageous embodiments are claimed in the dependent claims.

According to a first aspect of the present invention, a system for monitoring survey reflectors arranged at a plurality of locations on an object is provided, the system comprising:
  a camera, comprising:
    one or more first light sources for emitting a first divergent beam,
      wherein said one or more first light sources are arranged such as that a field in space corresponding to at least 10% of a field of view of the camera is illuminated by said one or more first light sources;
    an image sensor for receiving reflected light beams comprising reflections of said first divergent beam by said plurality of survey reflectors and for providing data;
    a body provided with an optical entry system, said body having a first side facing an interior space of said camera and a second side facing away from said interior space, wherein said image sensor is located in said interior space and said one or more first light sources are located on said second side of said body, wherein said one or more first light sources are arranged at a first distance from said optical entry system;
  and
  a processing unit configured for processing said data;
    wherein said processing unit is configured to determine a location of each survey reflector from said data and to detect a movement of one or more of said plurality of survey reflectors based on a comparison of the determined location of each survey reflector with previously determined locations of the survey reflectors.

The use of one or more light sources emitting a divergent beam enables the camera to capture an image of a plurality of survey reflectors, which are located at a distance from one another, simultaneously, without moving the camera and/or scanning the one or more light beams. The one or more first light sources are arranged such that the cumulative light beam created by the first divergent light beam emitted by each of the one or more first light sources cover a field in space at least 10% of the field of view of the camera. Thereby, all survey reflectors located within those 10% of the field of view of the camera can be illuminated, and hence monitored, simultaneously.

Thereby, the necessity to move the camera such as to scan a light beam emitted by the camera in order to monitor a plurality of survey reflectors can be avoided. This is in contrast to conventional systems, which generally uses collimated laser beams. Using a collimated laser beam has the advantage of providing light of high intensity, however, if provided on the camera for the use with passive reflectors, necessitates scanning the camera such as to monitor a plurality of survey reflectors.

The one or more first light sources each emit a divergent beam, which is a beam whose cross section has a non-negligible dimensions in two dimensions. In preferred embodiments, the first divergent beam represents a cone, preferably a right circular cone, having a first solid angle, which is larger than 0°. Alternatively, the first divergent beam may represent an elliptical cone. Since the light intensity, or luminous flux, of the divergent beam decreases with distance from the light source, preferably a high power light source, typically a high-power LED, should be used in order to maintain a desired operating distance, i.e., the distance at which survey reflectors can be detected.

In some embodiments, one first light source may be provided, emitting a light beam having a solid angle large enough to cover at least 10%, or even more, of the field of view of the camera.

According to an embodiment, the field in space corresponds to at least 50% of the field of view of the camera. In a preferred embodiment, the field in space illuminated by the one or more first light sources is substantially equal to or larger than the field of view of the camera. In some embodiments, one first light source may be provided, wherein the full field of view of the camera is illuminated with the first beam. In other embodiments, two or more first light sources are provided, wherein the assembly of their respective divergent light beams substantially covers the field of view of the camera.

Thereby, surveying can be performed faster as compared to prior art relying on scanning systems. Also, complexity of the system is reduced, as surveying and/or monitoring of a plurality of survey reflectors can be performed without relying on moving parts and/or a plurality of cameras.

As described herein above, in preferred embodiments the camera may be provided with a non-refractive element, for example a pinhole, acting as the objective. As described in WO 2019/143250 A1, this has several advantages, including reduced optical distortions compared to cameras using a refractive optical element, i.e. one or more lenses, forming the objective. In particular, several advantages over conventional cameras using lenses as objective have been observed for cameras using non-refractive optical elements, among which:

pure geometric character of the optical element;
minimal or even no chromatic aberrations;
an almost infinite depth of field;
minimal thermal sensitivity, due to very low thermal resistance and low thermal capacity of the body provided with the optical entry system;
the angle of view is dependent only on the size of the image sensor and the distance between the pinhole or slit and the image sensor;
the size of the image sensor and the optical entry system can be decreased;
it is very light weight, as the weight associated with lenses is avoided;
it is inexpensive, as the costs of lenses is avoided;
a relatively simple calibration procedure.

It might be advantageous to have more than one of the first light sources. If the optical entry system comprises non-refractive elements, such as one or more pinholes, the camera will be relatively sensitive for water droplets or dirt on the survey reflector. This is because a pinhole has infinite depth of field. By providing a plurality of first light sources at the camera the probability of the reflection of first beams emitted by the camera being negatively influenced by the disturbance on the prism may be reduced, leading to a more robust system.

By using survey reflectors, which are passive reflectors such as prisms, at the locations to be monitored, which are remote from the camera, and reflecting light emitted by one or more light sources located at, i.e., comprised in, the camera, a power source at the locations to be monitored may be omitted. According to some embodiments, which will be described in more detail further herein below, additional functionality may be provided at the locations to be monitored, which require a power source. These will however be of low power and/or configured to be active only for limited amount of time. Hence, the power consumption at the target locations to be monitored can be avoided all together or at least significantly reduced in comparison to the systems using beacons or other target objects having active light sources at the target locations. This reduces maintenance and eases installation, particularly for long term measurements.

The survey reflectors advantageously comprises prisms, such as conventional survey prisms. These are generally of low cost and widely available, providing a cost efficient system. Preferably, high-precision survey prisms, generally made of glass, may be used. Alternatively, the survey reflectors may comprise hollow mirrors, also referred to as cat's eyes. Other alternatives may also be possible, as will be understood by the person skilled in the art.

The one or more divergent light beams to be reflected by the survey reflectors are generated at the camera, which is located in a monitoring set-up at a central location, also referred to in this document as camera position, whereas the survey reflectors, for example provided in beacons or target units, are located at a plurality of different remote locations. Locating the one or more light sources at one central location allows using significantly higher power levels therefore than is the case for the light sources located at the plurality of target locations, as described by the prior art. Providing sufficient power sources, such as batteries and/or power harvesting systems, at a central location is less costly and/or requires less time and/or effort than providing power sources at a plurality of remote locations.

The one or more light sources can be located as a whole on one side of the body, or, alternatively, they may be partly incorporated in the body and arranged such as to emit light at a side of the body which does not face the image sensor. That is, the image sensor is located facing a first side of said body, and the first beam is emitted in a direction normal to a second, opposite side of said body.

The first light source is arranged at a first distance, $D1$, from the optical entry system, that is from the centre of the camera objective. As will be explained herein below with reference to the drawings, the first distance should be selected such that reflections of the first divergent light beams from the survey reflectors enter the camera through the optical entry system and reaches the image sensor.

According to an approximate definition, the first distance, $D1$, is smaller than a dimension of the surface area, for example a diameter in the case of a circular surface area, of the survey reflector at which the first beam impinges on the survey reflector. This approximation is based on a number of assumptions regarding the monitoring set-up, relating to the set-up being represented by a mathematically ideal situation, as is commonly used for modelling in physics. Such assumptions include, for example, the first light source being a point source and located in the same plane as the body in which the optical entry system is located, the optical entry system being infinitely small, and the survey reflectors projecting a perfect conical beam at the plane of the body holding the light source, centred at the first light source. However, to a first approximation, such model provides a good understanding and initial approximation of the first distance.

In practical situations, the survey reflectors will have a diameter in the range of 10 mm to 200 mm, generally between 20 and 100 mm. The first distance should be smaller than the diameter of the survey reflector. If survey prisms of different diameters are used, the first distance should be smaller than the smallest diameter of the survey reflectors. If target units, such as illustrated in FIGS. 11-15, the first distance should be smaller than the diameter of the individual survey reflectors.

The first light source advantageously comprises a light emitting diode, LED, preferably a high-power LED. The light emitted by the first light source may preferably be in the infrared range, although other wavelengths may also be possible. The first solid angle may preferably be larger than 45 degrees, more preferably larger than 50 degrees, most preferably larger than 60 degrees. The number of first light sources, and their position on the body, can be selected dependent on the solid angle of the beam emitted thereby, such that the light generated by the assembly of first light sources substantially covers the field of view of the camera. Thereby, all survey reflectors located within the field of view of the camera will be illuminated by the one or more first light sources, without a need for movement of the camera and/or light beams.

The image sensor is configured for receiving and detecting reflections of the one or more first divergent beams, emitted by the one or more first light sources, from all survey reflectors located within the part of the field of view of the camera which is illuminated by the one or more first divergent beams. To this end, the image sensor may preferably be a two-dimensional sensor.

By simultaneously irradiating a plurality of separately located survey reflectors with the one or more divergent beams generated by the one or more first light sources, the plurality of survey reflectors can be measured substantially simultaneously. Thereby, the complexity of the system and the time required for measurement can be reduced.

According to some embodiments, the optical entry system of the body comprises a non-refractive element, such as a slit or pinhole, forming the objective of the camera. In a further embodiment, the non-refractive objective optical element can comprise other diffractive elements, e.g. a Fresnel zone plate, a photon sieve, an arcuate slit, masks, or a holographic element. The non-refractive element allows passage of light, including light beams formed by reflections of the first beam onto the survey reflectors as well as ambient light, into the camera and onto the image sensor. Such non-refractive elements, and advantages thereof, were mentioned herein above and are described in detail in WO 2019/143250 A1.

According to alternative embodiments, the optical entry system comprises a lens or lens system. Preferably, the optical entry system comprise a single lens. If this lens is sufficiently thin, i.e., of low refractive power, and its mounting in the body relatively simple and/or well defined, temperature effects introduced by the lens and/or its mounting can be reduced and/or accounted for, e.g. by modelling, in the processing of the data recorded by the image sensor.

The body, which is provided with the optical entry system, may be substantially planar, or may have any other geometry allowing positioning an optical entry system or camera objective therein.

The processing unit can be located within or at the camera, for example in the interior space of the camera, close to the image sensor. Alternatively, the processing unit may be located remote from the camera.

The position and/or location of the survey reflectors is advantageously determined by image processing of the data recorded by the image sensor.

The system can be used for recording data substantially continuously, and/or at predetermined sampling intervals. In order to compensate for a loss in light intensity due to the use of a divergent light beam instead of a collimated beam and of a non-refractive optical element, such as a pinhole, instead of a lens for the camera objective, the integration time of the signal measured by the image sensor may be increased.

The use of survey reflectors, e.g. prisms, instead of active light sources at the target locations present certain challenges, solutions to which are presented in different embodiments of the invention described herein below.

Environmental influences, including ambient (diffuse) light entering the camera, may form disturbances, or noise, to the measurements and/or monitoring of the object.

In an embodiment, the processing unit is further configured to apply a first code to the first divergent beam by modulation of the beam. Thereby, a defined code, or pattern, will be applied, or superpositioned, onto the first divergent beam. This first code may be applied in a variety of manners, which may be known from the field of signal processing. Advantageously, the first code may be provided by amplitude modulation of the first divergent beam, resulting in the amplitude of the beam varying over time in a defined manner. For example, the beam may vary in a sinusoidal manner, the sinusoidal having a defined frequency and/or phase. By amplitude modulation of the first divergent beam, while sequentially recording data from the image sensor, and by applying filtering techniques during image processing of the recorded data frames, environmental influences can be suppressed. These filtering techniques reduce the ambient light (read: constant light) level in the processed image, preferably to a very low level, while the modulated light in the processed image is not suppressed.

It is to be understood, that the modulation of the light beams may be performed in a variety of different ways, including amplitude modulation, modulation of phase and/or frequency, different polarizations, etc., as will be understood by the skilled person. The modulation at different frequencies as described herein should be understood as encompassing any suitable means of providing the beams with different codes enabling to distinguish between their respective reflected beams.

The measurements and/or monitoring of the object may also be negatively influenced by reflections, which may be diffuse or mirror like, of the first divergent beam from other surfaces than the survey reflectors. These reflections may interfere with the reflections from a prism or even appear as false targets.

Reflections of the light emitted by the first light source from objects, other than the survey reflectors, will however not be sufficiently suppressed by the above mentioned technique. It may therefore be an object of the present invention to reduce the effect of reflections of the light generated at the camera at objects other than the survey reflectors.

According to an embodiment, the apparatus further comprises one or more second light sources each for emitting a second divergent beam, wherein said one or more second light sources are arranged at a second distance, D2, from said optical entry system which is larger than the first distance at which the one of more first light sources are located, and wherein the processing unit is configured to apply a second code to the second divergent light beam, wherein the second code is different from the first code. The second code may be applied in a manner analogous to the first code. Similar to the first divergent beam, the second divergent beam is preferably cone-shaped, having a solid angle $\Omega 2$ which is larger than zero.

Thereby, the one or more second divergent light beams are distinguishable from the one or more first divergent light beams. In particular, the reflections of the first divergent light beams detected by the image sensor are distinguishable from the reflections of the second divergent light beams detected by the image sensor. This is advantageously and can be used as described in more detail in other parts of the present document.

The second distance should be selected such that reflections of the second divergent light beams from the survey reflectors do not enter the camera through the optical entry system. According to an approximate definition, analogous to the approximate definition of the first distance, the second distance is larger than a dimension of the surface area, for example a diameter in the case of a circular surface area, at which the first beam impinges on the survey reflector. Herein above, typical values for the dimension, i.e., diameter, of the survey reflectors were given. The second distance should be larger than this dimension. If a plurality of survey reflectors having different dimensions, i.e., diameters, are used, the second distance should be larger than the largest dimension, such that reflections of the second divergent light beam are prevented from entering through the optical entry system.

Hence, the first and the second beam may be distinguished from one another, either during image processing and/or by physical measures in the system or measurement set-up.

According to an embodiment, the first beam is amplitude modulated with a modulation frequency and the second beam is amplitude modulated with the anti-phase of this modulation frequency. Thereby, the camera objective, advantageously formed by a non-refractive element, e.g. a pinhole, will only see the first light source reflected in the prism. All other objects in the field of view however, will reflect light of both sources back into the objective. However, the in-phase and anti-phase modulated light added together will appear as a constant light source and will be significantly suppressed in the image processing (in analogy with ambient light).

According to a further embodiment, the first light source may emit light of a first wavelength, $\lambda 1$, and the second light source may emit light of a second wavelength, $\lambda 2$, which is different from the first wavelength. The first and second wavelengths are preferably relatively close to one another such that the image sensor has substantially the same sensitivity to both wavelengths. By fitting the survey reflectors with a bandpass filter allowing passage of the first wavelength, $\lambda 1$, but not the second wavelength, $\lambda 2$, only the first light beam will be reflected by the survey reflectors. In this embodiment, the one or more second light sources are preferably arranged close to the one or more first light sources, i.e., preferably at the first distance, rather than at the second distance as described above, in order to avoid differences in illumination of reflective surfaces by the first and second beams, respectively. However, the method may provide acceptable results also for second light sources located at the second distance. Also in this embodiment, the first and second beams are provided with first and second coding, respectively. By subtracting the images associated with the first and second codes, respectively, as described above, the reflection caused by the survey reflectors can be obtained, the influences of ambient light having been filtered out.

By these different embodiments, reflections from the survey reflectors may be distinguished from mirror-like reflections from other surfaces than the survey reflectors, i.e., from false targets.

It may further be desirable to measure the distance between the camera and the survey reflectors. In particular, it may be desirable to measure the distance in a time efficient manner.

According to an embodiment, the system further comprises one or more third light sources configured to emit a third divergent beam, wherein said one or more third light source are arranged at a third distance from said optical entry system which is substantially similar to said first distance, and wherein the processing unit is further configured to apply a third code to said third divergent beam, wherein said third code is different from the first code. If used together with one or more second light sources described above, the third code is different also from the second code. Similar to the first divergent beam, the third divergent beam is preferably cone-shaped, having a solid angle $\Omega 3$ which is larger than zero. The first and the third divergent beams have substantially the same wavelength. From the images resulting from the first and the third light sources, respectively, the distance between the image sensor, i.e., the camera, and the different survey reflectors can be measured. The positions of the first and third light sources, respectively, are known, as are the distance between the optical entry system and the image sensor and the optical properties of the optical entry system. Thereby, the distance between the camera and the survey reflector, associated with a specific reflection as detected on the image sensor, can be determined. The one or more first and third light sources are preferably arranged on opposite sides of the optical entry system, as this may maximize the baseline between the detected reflections.

The second and third light sources described herein advantageously, similar to the first light source, comprise a light emitting diode. The first, second and third light sources preferably emit light of substantially the same wavelength, unless explicitly described otherwise.

The image sensor provides frames of raw data substantially continuously or at specified sampling intervals. A series of such frames of raw data recorded at different sampling times, is subjected to various steps of image processing, such as filtering, mathematical operations, etc., such as to produce an image representing reflections from the survey reflectors of the light emitted from the camera. The series comprises at least two, but preferably a larger number, which may even be as large as 1000, 10,000, or even larger, of such raw data frames. One or more further steps may also be included, as will be understood by the person skilled in the art. Images can be obtained for, respectively, the one or more first, second or third, light sources, which have different coding, or modulation, as described herein above, while filtering out contributions from the other light sources. From the images representing reflections of the light originating from the first, second, and/or third light sources, respectively, various information can be obtained.

For example, as described herein, by subtracting images relating to the second light sources, i.e., reflected light having the second code detected by the image sensor, can be subtracted from images relating to the first light source, i.e., reflected light having the first code having reached the image sensor. Thereby, information originating from the first divergent light beam having been reflected by one or more survey reflectors can be obtained. This technique has been seen to suppress reflections of the first divergent beam from reflecting surfaces other than the survey reflectors, i.e., from so called false targets. A suppression of more than 10 dB, in particular 10-50 dB or even more, has been achieved using this technique.

By combining images associated with the light of the first coding with corresponding images associated with the third coding, the distance between the camera and the survey reflectors can be determined. Also, from the symmetry properties of the resulting image, false targets can be recognized.

Additional processing steps may be applied to the data recorded by the image sensor and/or images obtained through processing of this data. In particular, correlation techniques may be applied, e.g. when comparing images with one or more previously obtained images and/or specification data, to thereby detect and/or determine movement of one or more of the survey reflectors and/or deformation of the object.

According to embodiments, the processing unit is further configured for applying a command code to said first divergent beam. Thereby, a command or signal providing instructions, information and/or requests may be sent to the survey reflectors. By applying this command or signal to the first divergent beam, it will be broadcast simultaneously to all survey reflectors illuminated by the first divergent beam. To this end, the survey reflectors may be provided with, or have arranged next to it, a target unit comprising a receiver for receiving the command, a target processing unit for detecting and processing it, and, preferably, one or more further features for performing an action in response to the command. For example, such target unit may be provided, and/or comprise, a survey reflector identification unit as described herein below. An example of such command or signal may, for example, be a command requesting the survey reflectors to identify themselves, by sending out an identification signal in response to the command. Alternatively or additionally, other types of information, for example telemetry data, may be requested from the survey reflectors by this technique.

It may be a further object of the invention to enable distinguishing the different survey reflectors from one another.

In an embodiment, the system further comprises a survey reflector identification unit, said identification unit configured for emitting an identification signal upon request from the camera, wherein the identification signal is unique for each survey reflector. This survey reflector identification unit is configured to be arranged at the survey reflector.

The survey reflector identification unit advantageously comprises:
  A light receiver for receiving the first divergent beam emitted by the camera;
  A microcontroller coupled to said light receiver; and
  An identification unit light emitter, configured to emit said identification signal when a command therefore is detected by said microcontroller. The identification signal may advantageously be emitted in the form of a code, which is emitted for a limited amount of time.

The light receiver may advantageously be a ultra-low power, highly sensitive light receiver, having only low power consumption. An example of such receiver is described in WO 2020/027660 A1. The light receiver may be configured to substantially continuously receive the first light beam, the microcontroller determining whether or not a command or request for an identification signal is provided in the first light beam.

The camera may advantageously be configured to emit the command or request for the identification signal via the light emitted by the first light source, for example as a signal or code added or superpositioned onto the first divergent light beam. Thereby, the request for identification is sent simultaneously to all survey reflectors within the part of the field of view covered by the one more first divergent light beams. That is, the same identification request is received by each survey reflector, which in response each emit their unique identification signal back to the camera.

This enables substantially simultaneous identification of each survey reflector within the part of the field of view of the camera illuminated by the one or more first light sources in a substantially automated manner, hence further facilitating automatic surveying and/or monitoring of the plurality of survey reflectors.

Since the identification unit light emitter, which may comprise for example a light emitting diode, only emits the identification signal in response to a request therefore, energy consumption of the identification unit can be maintained low.

The different embodiments described above may be combined, in a way as will be understood by the skilled person.

In a second aspect of the invention, a method for monitoring a plurality of survey reflectors on an object is provided, the method comprising:
  monitoring, at a first camera position, said locations by:
    emitting, by each one of one or more first light sources, a first divergent beam, having a solid angle larger than zero, towards said plurality of survey reflectors, wherein said plurality of survey reflectors are irradiated substantially simultaneously by said one or more first divergent beams from said one or more first light sources, wherein said one or more first light sources are maintained in a substantially fixed position;
    recording, by an image sensor, data representing reflected light beams comprising reflections of said first divergent beam by said plurality of survey reflectors; and
    determining, by image processing of said data, a location of each survey reflector from said data and detecting a movement of one or more of said plurality of survey reflectors based on a comparison of the determined location of each survey reflector with previously determined locations of the survey reflectors.

The method according to the second aspect of the invention can advantageously be performed using the system according to the first aspect, achieving corresponding effects and advantages.

In preferred embodiments, the image processing of the data comprises one or more steps described with respect to the first aspect.

In particular, the method may further be configured to reduce the environmental interference, and/or disturbances from false targets, as described above with reference to the first aspect.

In an embodiment, a first code is applied to the first divergent beam. This can be applied according to any of the methods as described with reference to the first aspect. Filtering techniques may be applied when image processing said data, thereby distinguishing light originating from reflections of said first beam from other light sources and/or other reflections According to some embodiments the method further comprises the steps of:
  providing a body provided with an optical entry system allowing passage of light, the body having a first side and a second side, and arranging said body such that said first side faces an interior space of said camera and said second side faces away from said interior space, such that said image sensor is arranged in said interior space on a first side of said body and said one or more first light sources on said second side of said body;

arranging said one or more first light sources at a first distance, D1, from said optical entry system; and arranging one or more second light sources at a second distance D2 which is larger than the first distance, D1, and emitting a second divergent beam by each of said one or more second light sources; and applying a second code to the second divergent beam, wherein the second code is different from the first code.

The first and second distances are preferably defined as defined herein above with reference to the first aspect. The first and second codes may be applied according to one or more of the techniques described above with reference to the first aspect.

According to some embodiments, the method further comprises:

Generating a first image from reflected light provided with the first code;

Generating a second image from reflected light provided with the second code; and Subtracting the second image from the first image, and determining the positions and/or movements of one or more of the survey reflectors from resulting image.

Thereby, the image resulting from reflections of the first beam, i.e., the measurement beam, can be separated from disturbances caused by environmental influences.

A further object of the present invention is to distinguish reflections from the survey reflectors from other mirror-like reflections, i.e., false targets.

According to an embodiment, the method further comprises providing one or more third light sources, and applying a third code to the third divergent beam, the third code being different from the first code. The third light sources are arranged at a third distance, D3, from the optical entry system which is comparable to the first distance. The process of applying a coding may be performed as described above. The method further comprises the step of determining, based on an image achieved for reflections of the first and third divergent beam, respectively, whether or not the detected image originates from a survey reflector or from a different reflective element. This can be determined based on whether or not the detected image is mirrored or not with respect to the locations of the light sources.

Reflections from a survey reflector of the first and the second light beams, respectively, will appear as two separate, distinguishable targets in images obtained by image processing of the data. If reflected from a prism, or from a hollow mirror if the light sources are located outside the focal distance of the hollow mirror, the image will appear mirrored with respect to the center of the prism or hollow mirror. Thereby, it can be verified that these reflections originate from a survey reflector and not from a different, reflective surface within the field of view of the camera.

A further object of the invention may be to determine the distance between the camera and the survey reflectors.

This can be realised by an embodiment wherein the method further comprises providing one or more third light sources as described herein above, preferably at an opposite side of said non-refractive element than the first light sources. The distance between the camera and a survey reflector may be determined from a distance between a first point, p1, in a resulting image originating from a reflection of light emitted from the first light source from the survey reflector and a second point, p2, originating from a reflection of light emitted from the third light source from the survey reflector.

In this embodiment, since the position of the first and third light source relative to one another and to the optical entry system, for example a non-refractive element such as a pinhole, the distance between the camera and the survey reflector can be determined. The first and third light sources do not have to be located at opposite sides of the non-refractive element, although this may be preferable as it maximizes the baseline between the two light sources while both light sources remain within a set maximum distance from the optical entry system.

The embodiment for measuring distance may advantageously be combined with any one of the embodiments described above for suppressing unwanted reflections. Thereby, reflections can be distinguished and/or suppressed, while, at the same time, the distance between the camera and the survey reflector can be measured.

According to an embodiment the distance may be determined by the method further comprising:

providing the body with a first and a second optical entry system;

determining the distance between the camera and the survey reflector from the baseline between the first and second optical entry systems and the distance between the projected target image resulting from the first and second optical entry systems.

The first and second optical entry systems may, as described herein above, comprise non-refractive elements, for example pinholes, or one or more lenses, preferably a single lens, acting as the objective of the camera.

According to another embodiment the distance may be determined by using two cameras located at different camera positions, the cameras arranged to view the same set of survey reflectors, with the optical axes of the respective cameras at an inclination with respect to one another. The method further comprises:

monitoring said locations at a second camera position which is positioned at a distance from said first camera position, a first viewing line between said first camera position and a reference survey reflector oriented at an angle with respect to a second viewing line between said second camera position and said reference survey reflector; and determining three dimensional coordinates of said survey reflectors based on said monitoring at said first camera position and said second camera position;

wherein said monitoring at said second location is performed in a similar manner as said monitoring at said first location.

The three dimensional coordinates can be determined according to various methods, as can be understood by the person skilled in the art. For example, triangulation methods may be used. Usually one or more parameters, such as distances between one or more of the features and/or angles of orientations of one or more features with respect to one another, in the above set-up are known.

The determination of the three dimensional coordinates of the survey reflectors will require a minimum amount of survey reflectors being monitored by both cameras, as well as one or more distances (between two survey reflectors, between the two cameras, or between one of the cameras and one of the survey reflectors) being known. This will provide a set of equations having a number of un-knowns, which can be solved by known mathematical methods. Optionally, additionally the orientation or inclination (pitch and roll) of the cameras can be measured, for example by a tilt sensor provided on the cameras. Knowing the inclination of the cameras reduces the number of survey reflectors required for solving the equations.

As described above with reference to the first aspect, a further object of the present invention may be to distinguish between the different survey reflectors.

According to an embodiment, the method further comprises:
- emitting a survey reflector identification command using said one or more first light sources; and
- emitting, by an identification unit light emitter located at said survey reflector, an identification signal in response to said survey reflector identification command.

Advantageously, the identification signal is emitted in the form of a code, which is emitted for a limited amount of time. Preferably, the identification signal is unique for each survey reflector, in particular for neighboring survey reflectors. For survey reflectors located sufficiently far away as to be distinguishable from one another based on the distance, identification signals or codes may be reused. In this case, they may be combined with an additional code or signal providing unique identification when detected and/or interpreted in conjunction with the identification signal.

This may be achieved by using a survey reflector identification unit as described above.

According to a third aspect, a system for monitoring survey reflectors arranged at a plurality of locations on an object is provided, the system comprising:
- a camera configured for monitoring said survey reflectors, said camera comprising:
  - one or more first light sources each for emitting a first divergent beam;
  - one or more second light sources for emitting a second divergent beam;
  - an image sensor for receiving reflected light beams comprising reflections of said first divergent beam by said plurality of survey reflectors and for providing data;
  - a body provided with an optical entry system, said body having a first side facing an interior space of said camera and a second side facing away from said interior space, wherein said image sensor is located in said interior space and said first and second light sources are located on said second side of said body;
- a processing unit configured for processing said data;
- wherein said first light source is arranged at a first distance, D1, from said optical entry system, and said second light source is arranged at a second distance, D2, from said optical entry system which is larger than the first distance,
- wherein the processing unit is configured to apply a first code to the first divergent beam and a second code to the second divergent beam, wherein the second code is different from the first code.

The features of the system according to the third aspect are preferably analogous or similar to the corresponding features of the system according to the first aspect, and may be combined with any one of the features or embodiments thereof.

The first and second divergent beams are divergent beams having a solid angle larger than zero, and may preferably be cone shaped.

In particular, the processing unit advantageously operates and/or functions in the manner described above with reference to the first aspect.

According to a fourth aspect, a method for monitoring locations on an object is provided, the method comprising:
- providing a plurality of survey reflectors on said object, each survey reflector provided at one of said locations; monitoring said locations by:
  - emitting, by each one of one or more first light sources, a first divergent beam towards said plurality of survey reflectors;
  - emitting, by each one of one or more second light sources, a second divergent beam towards said plurality of survey reflectors;
  - recording, by an image sensor, data representing reflected light beams comprising reflections of said first divergent beam by said plurality of survey reflectors; and
  - determining, by image processing of said data, a location of each survey reflector from said data and detecting a movement of one or more of said plurality of survey reflectors based on a comparison of the determined location of each survey reflector with previously determined locations of the survey reflectors;
- wherein the method further comprises applying a first code to the first divergent beam and a second code to the second divergent beam, wherein the second code is different from the first code.

These features in particular enable distinguishing reflections of the survey reflectors from other reflections and/or ambient light entering the camera, and/or reducing the influence and/or disturbance from environmental influences and/or reflections from surfaces other than the survey reflectors.

The method according to the fourth aspect may advantageously be performed using an apparatus according to the third aspect, obtaining technical effects and/or advantages as described above with reference to the third aspect.

The method according to the fourth aspect may comprise one or more steps or features described with reference to the second aspect.

According to a fifth aspect of the present invention, a beacon is provided, comprising a survey reflector as described above. Furthermore, the beacon may comprise a survey reflector identification unit as described above. Furthermore, in the beacon the survey reflector may be provided, i.e., fitted with, an optical bandpass filter, and/or an active modulator, as described above.

According to a sixth aspect, a system for monitoring locations on an object is provided, comprising a system according to the first or third aspect, and a plurality of beacons according to the fifth aspect.

As described above, a wide, divergent beam, preferably from a LED, is used, in contrast to conventional survey systems which use a collimated laser beam. The use of a divergent light beam leads to a lower luminous flux, or light intensity per cross sectional area, at the survey reflectors. As a consequence, the intensity of the reflected light reaching the camera and the image sensor will be lower. This may put an undesired limitation on the operational range of the system. In particular in the preferred embodiments wherein the camera is provided with a pinhole, or other non-refractive optical element, as objective, this may lead to a very low light intensity at the image sensor. Therefore, it would be desirable to increase the light intensity of the reflected light reaching the image sensor.

According to a seventh aspect, a target unit for use in any of the systems or methods described above is provided, the target unit comprising a plurality of survey reflectors arranged in one single plane.

By the use of target units comprising a plurality of survey reflectors arranged in one single plane, the amount of reflected light is increased, leading to a higher light intensity at the image sensor, compared to a situation where individual survey reflectors are used at each of the plurality of locations at the object to be monitored. Thereby, the operating distance and the range of detection, of a survey system, such as the survey systems described herein above, can be increased. The target units comprising a plurality of survey reflectors, such as survey prisms, are visible at larger distances than individual survey reflectors conventionally used.

The survey reflectors are preferably high-precision survey reflectors, e.g. of the type made of glass. These are high-precision, machined glass prisms, providing significantly higher accuracy and intensity of the reflected light than low cost molded plastic prisms conventionally used in surveying applications.

The survey reflectors are arranged in one single plane in the sense that corresponding points or locations of the plurality of survey reflectors are all arranged in the same plane. Thereby, effectively a substantially planar survey reflector is achieved, having a larger reflective area than a single survey reflector.

It can be noted that in order to increase the intensity of the reflected light, a plurality of survey reflectors are needed, as increasing the dimensions of a single survey reflector, or prism, will not lead to increased intensity.

As mentioned above, the minimum size of the individual survey reflectors is considered to be determined by the distance between the first light source, typically a LED, and the pinhole, or other non-refractive optical element, used as camera objective. According to theory, when using prisms, or survey reflectors, having a circular base facing the incoming light beam, the diameter of this should be at least equal to this distance. When using prisms having a triangular or hexagonal shape base, this should have a dimension such that a diameter of an imaginary inscribed circle is at least as large as this distance.

According to an embodiment, the survey reflectors are arranged in an array having one of said survey reflectors arranged in a centre of said array, said centre representing a point of symmetry of said array. The array, which as mentioned is located in one single plane, may have mirror symmetry and/or rotational symmetry with respect to the centre reflector. For example, the survey reflectors may be arranged in a hexagonal array pattern. In this way, the survey reflectors are arranged in an efficient arrangement, i.e., are densely packed, maximizing the reflective area of the target unit. By the symmetric arrangement of the survey reflectors, the increase in intensity or power of the light reflected by the multiple survey reflectors as compared to a single survey reflector will be substantially equal in both vertical and horizontal direction.

According to an embodiment, each survey reflectors has a surface configured for receiving an incoming light beam, wherein said surface is substantially circular. Alternatively, other shapes of the light receiving surface, or base of the reflector, can be used, such as triangular or hexagonal.

In particular when the survey reflectors, typically prism, have a circular base, or front face, receiving the incoming light beam, the hexagonal arrangement provides an efficient arrangement of the reflectors. Also for other shapes, for example triangular, of the base, or front face, receiving incoming light a hexagonal arrangement may provide the most efficient packing. Alternatively, when using survey prisms having triangular base, the reflectors may be arranged with their triangular sides abutting one another.

According to an embodiment, the plurality of survey reflectors are realized by a plurality of survey prisms, the prisms preferably being substantially identical, and wherein a surface of the prisms configured for receiving an incoming light beam are arranged in said one single plane.

According to another embodiment, the plurality of survey reflectors are realized by a plurality of hollow mirrors each having a centre point, the hollow mirrors preferably being substantially identical, and wherein the centre point of all mirrors are arranged in said one single plane.

According to an embodiment, the plurality of survey reflectors comprises 13 to 35 reflectors. The number of survey reflectors in the target unit is typically chosen such as to achieve efficient reflection of the light beam emitted by the camera and/or survey system, while maintaining the reflective area of the target unit such as to be considered substantially point like with respect to the camera. The number of individual survey reflectors included in the target unit may be set dependent on the distance between the camera and the target units. Increasing the number of survey reflectors in the target unit will generally increase the operating distance or range of detection of the system.

The features of the different embodiments of the target unit may be combined.

According to an eight aspect, the systems according to the first and/or third aspect described herein above further comprises a plurality of target units according to the seventh aspect.

In Summary, according to advantageous embodiments, a system according to the first and/or third aspect is provided, wherein the camera uses a pinhole, or other non-refractive optical element, as objective, and a plurality of target units according to the seventh aspect arranged at an object to be monitored. As described herein above, the survey light to be reflected by the survey reflectors of the target unit is generated as one or more divergent light beams at the camera, the one or more divergent light beams forming a divergent light beam having a solid angle such that at least 10%, preferably 50% or more, of the field of view of the camera is illuminated by the divergent light beam(s). By this system, points or locations of an object such as a building or other structure, can be monitored with high angular precision, while the system avoids the use of any moving parts.

Although the use of a wide beam, such as a divergent beam emitted by a LED, in combination with the use of a pinhole instead of a lens as camera objective, may lead to a loss of light in comparison with conventional systems using a collimated laser beam and a camera having a lens-based objective, a reliable system providing measurements having high accuracy have been achieved. As described herein above, the loss of light may be compensated by using LED light sources of high power, integrating the measurements, and/or the use of multiple survey reflectors at individual locations on the object to be monitored.

BRIEF DESCRIPTION OF THE DRAWINGS

Embodiments of the present disclosure will be described herein below with reference to the accompanying drawings. However, the embodiments of the present disclosure are not limited to the specific embodiments and should be construed as including all modifications, changes, equivalent devices and methods, and/or alternative embodiments of the present disclosure.

The terms "have," "may have," "include," and "may include" as used herein indicate the presence of corresponding features (for example, elements such as numerical values, functions, operations, or parts), and do not preclude the presence of additional features.

Figure 1B:
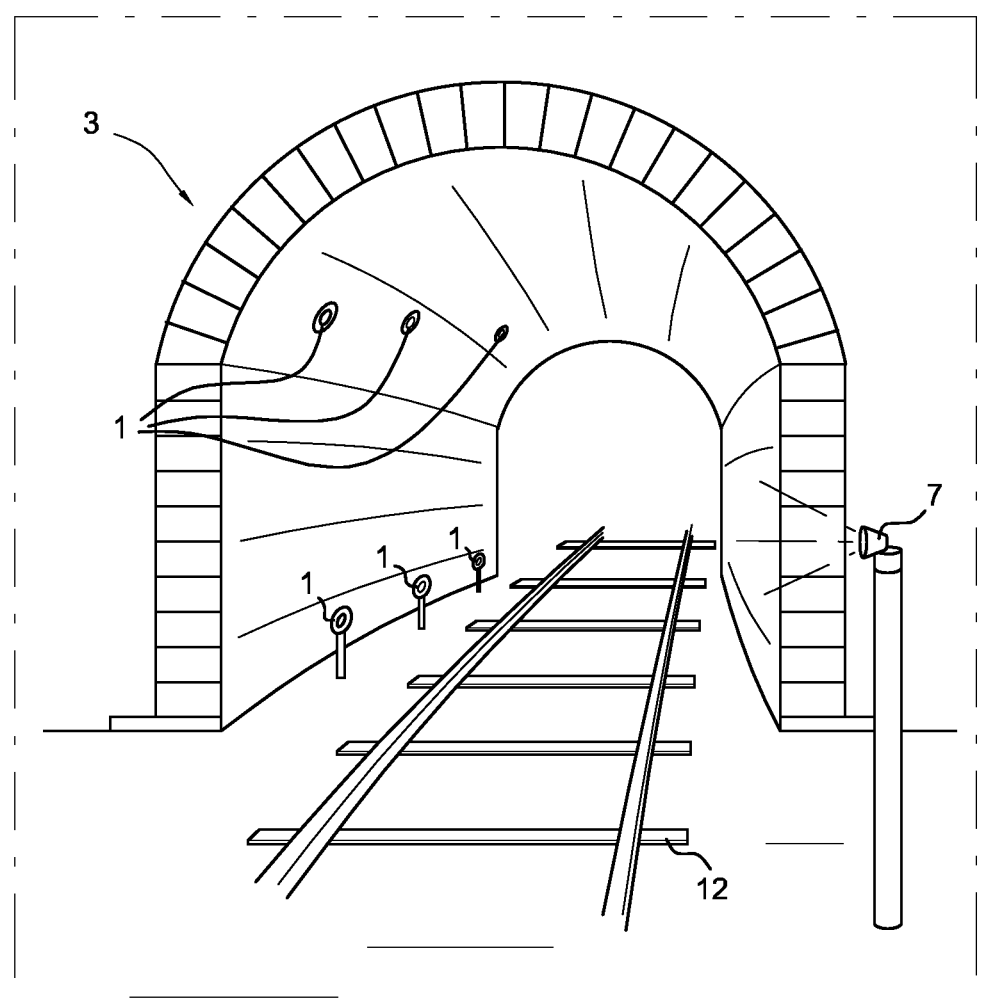

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may modify various elements regardless of an order and/or importance of the corresponding elements, and do not limit the corresponding elements. These terms may be used for the purpose of distinguishing one element from another element. For example, a first element may be referred to as a second element without departing from the scope the present invention, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for" "having the capacity to" "designed to" "adapted to" "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context.

The terms used in describing the various embodiments of the present disclosure are for the purpose of describing particular embodiments and are not intended to limit the present disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the present disclosure.

For the purpose of determining the extent of protection conferred by the claims of this document, due account shall be taken of any element which is equivalent to an element specified in the claims.

Figure 1C:
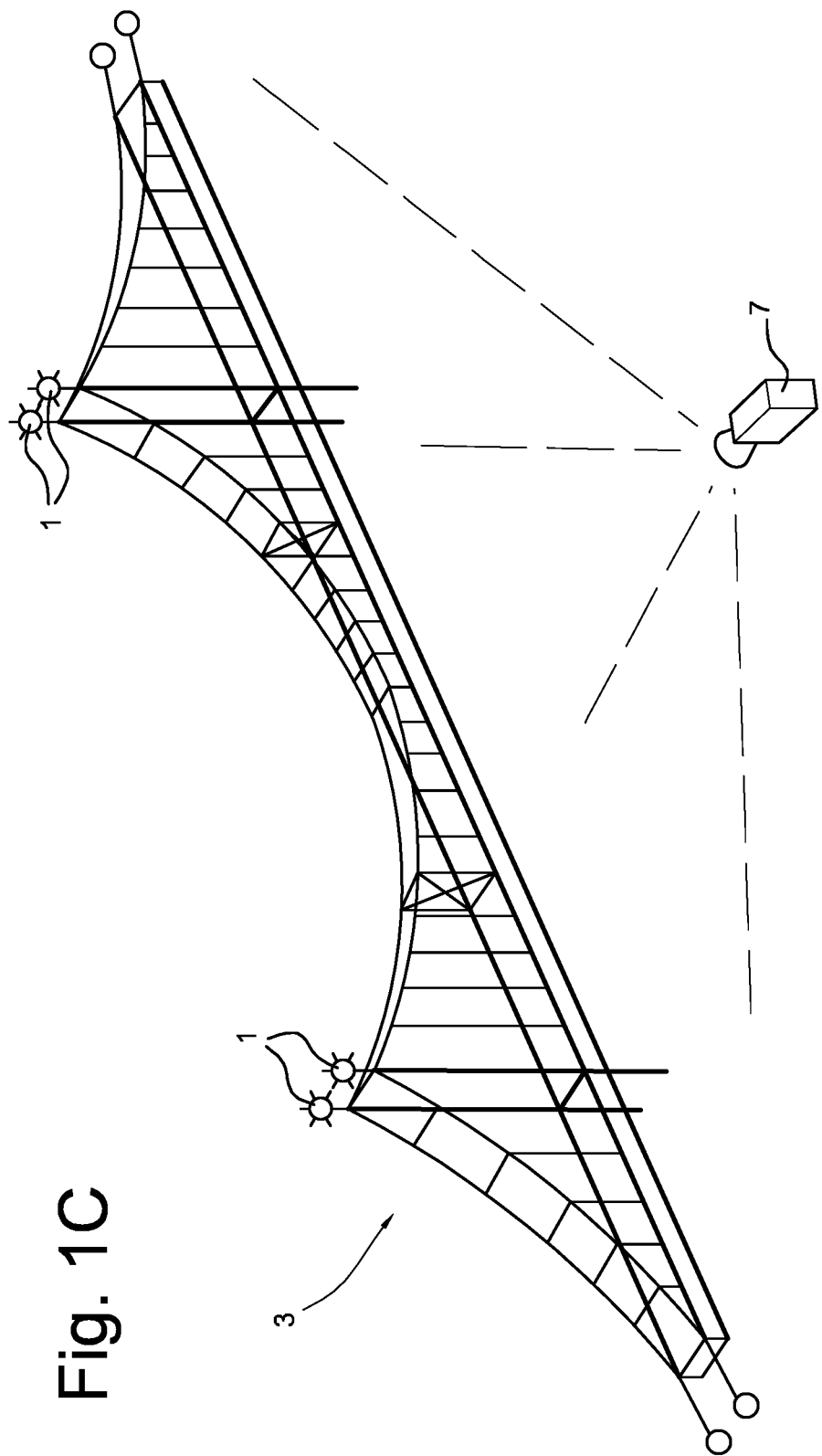
Figure 3:
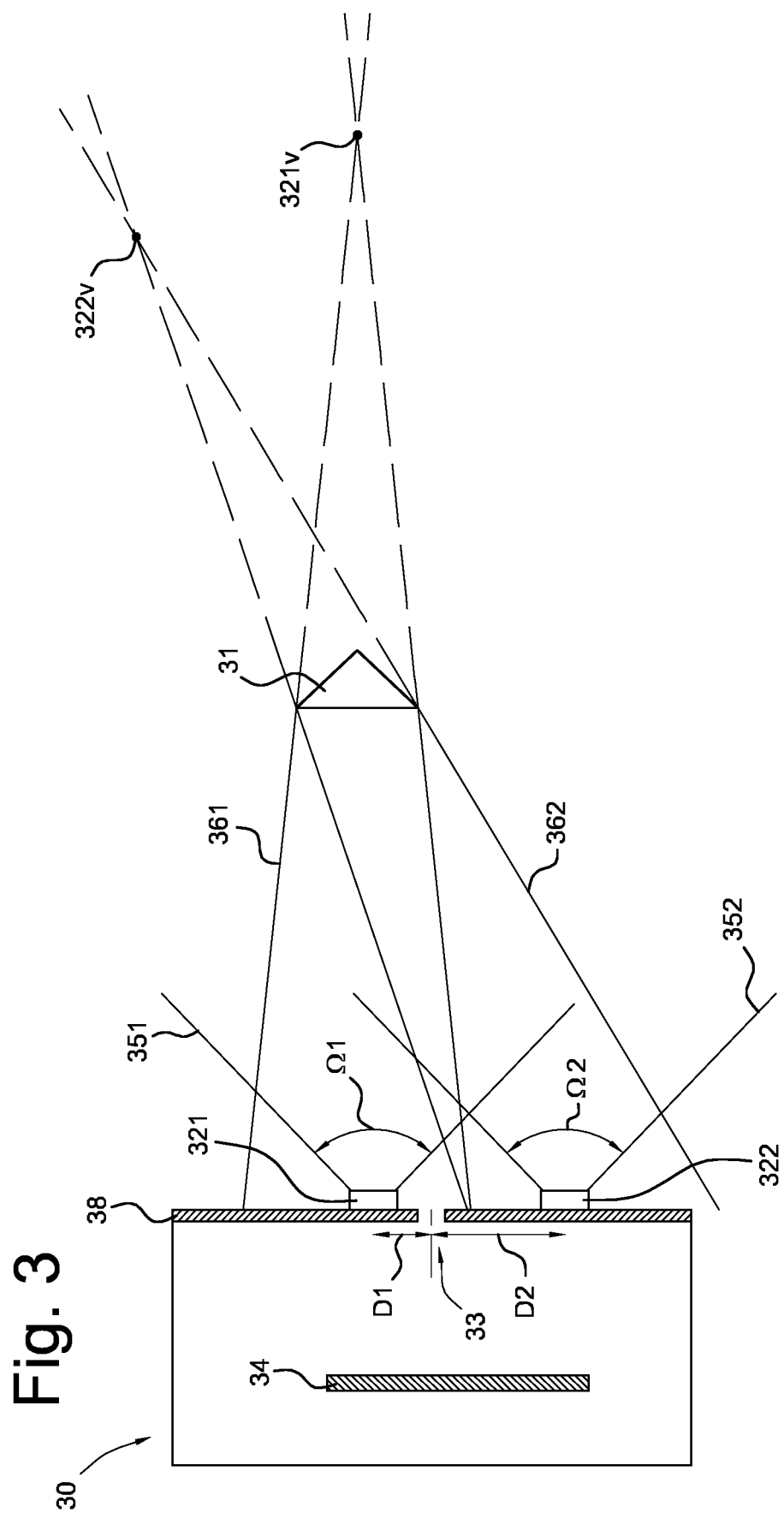
Figure 5B:
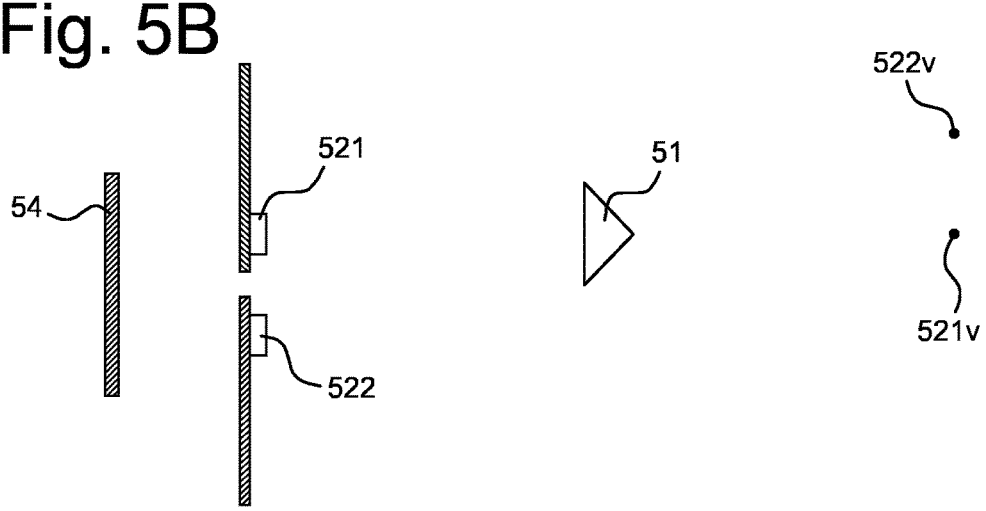
Figure 6:
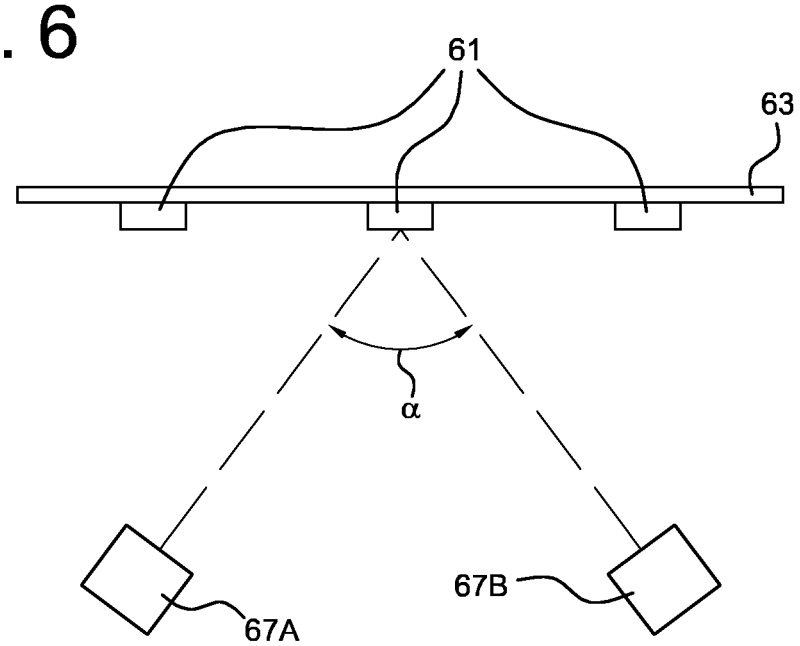
Figure 7:
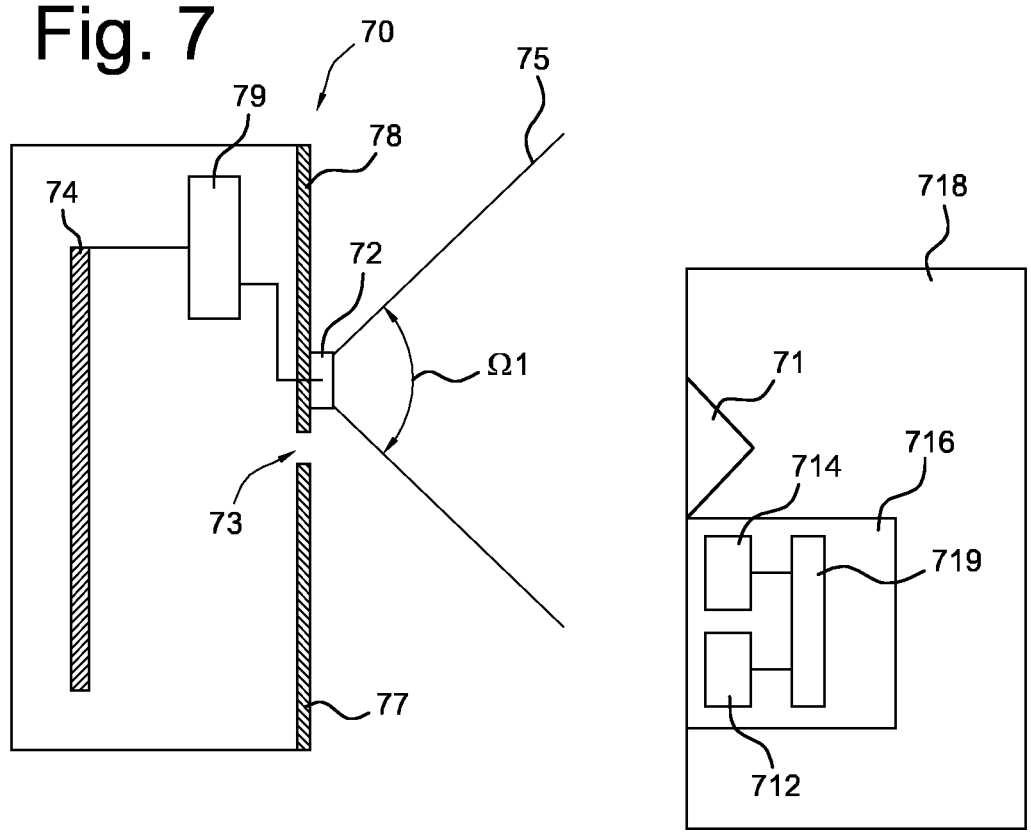
Figure 8:
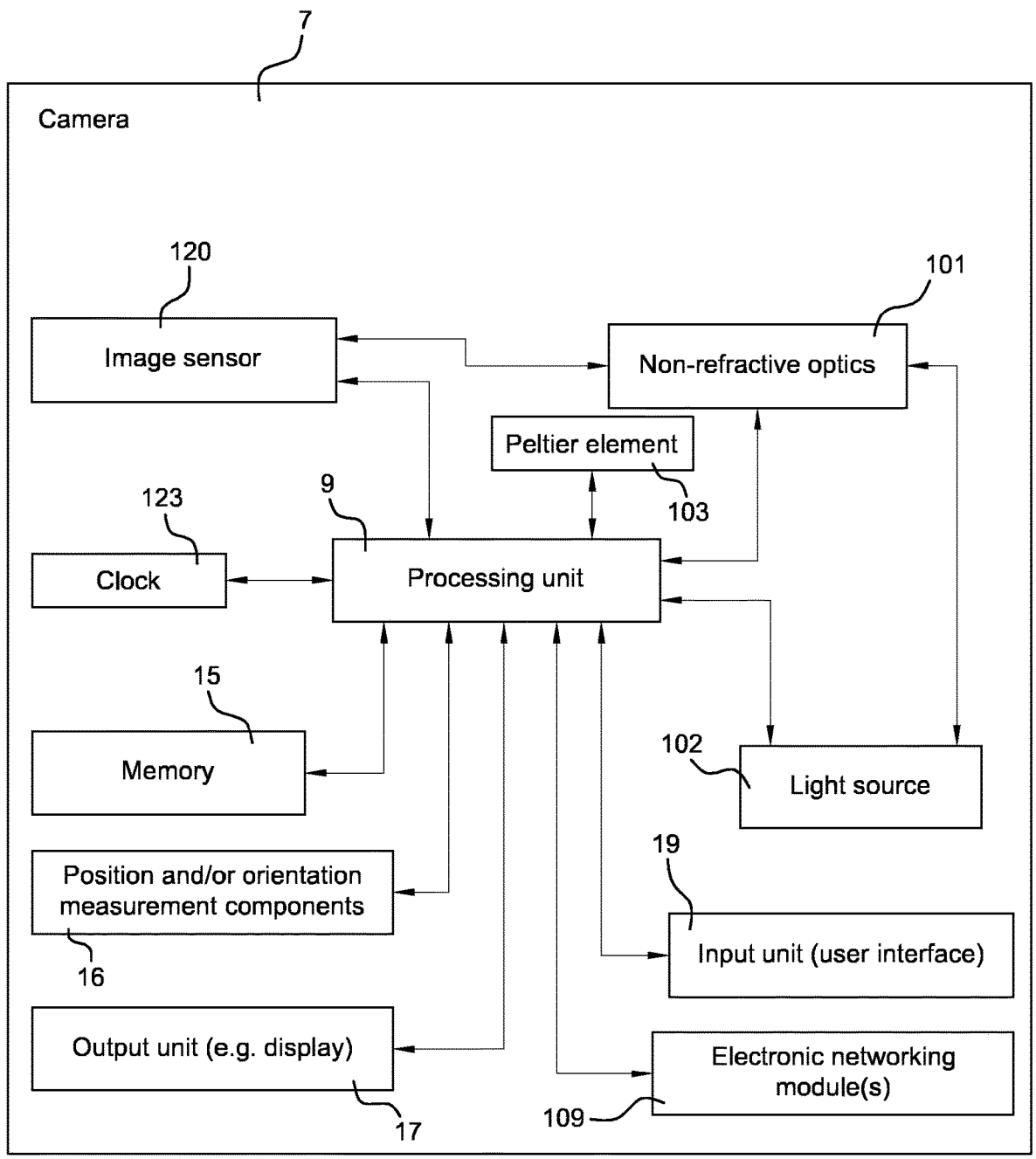
Figure 9:
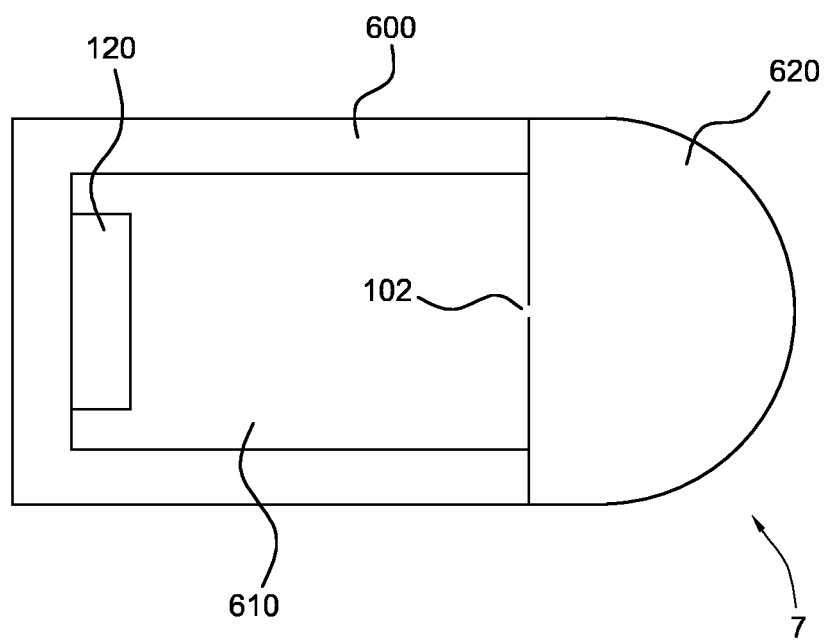
Figure 10:
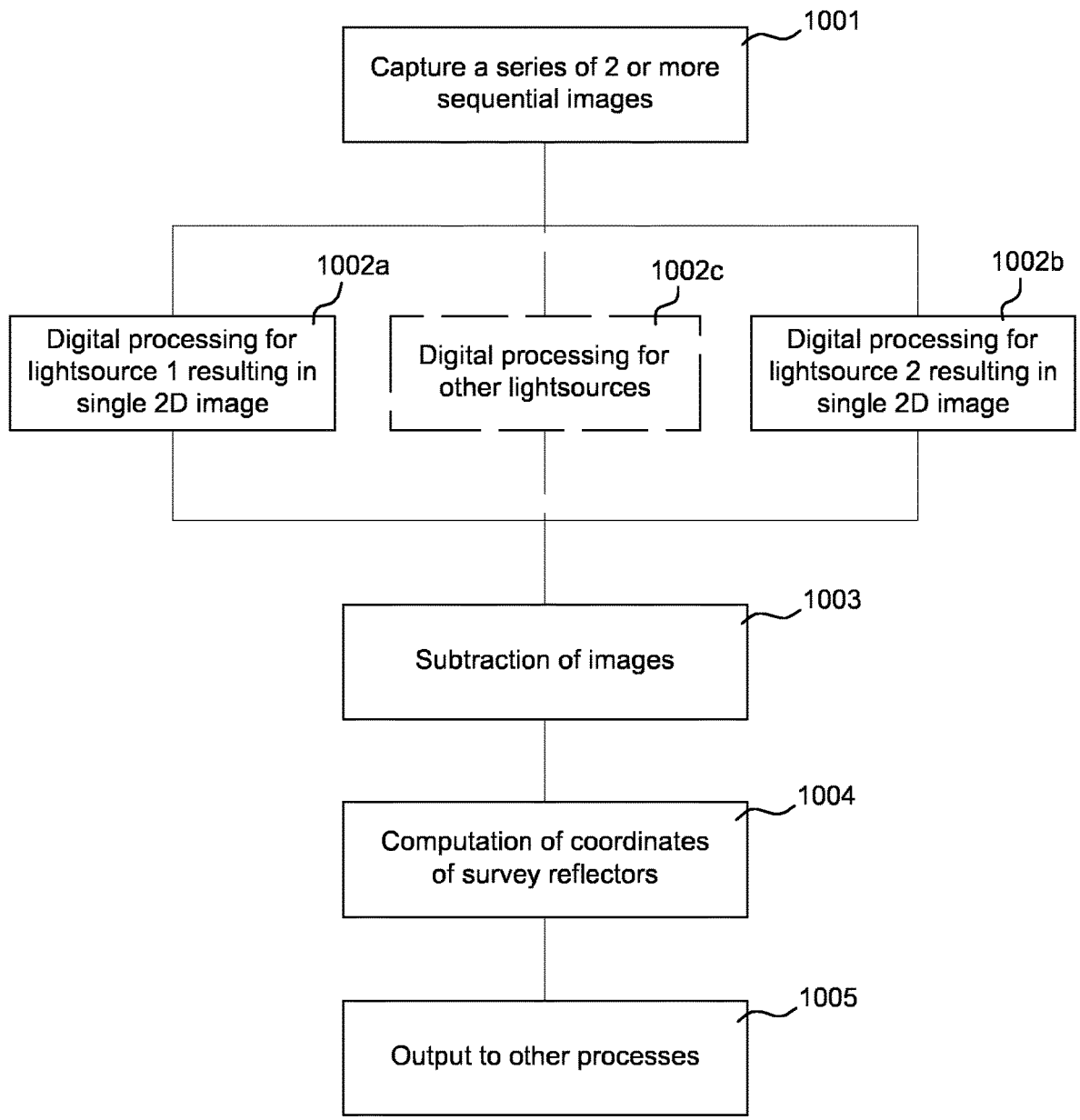

The present invention will be discussed in more detail below, with reference to the attached drawings, in which:

FIG. 1A-1C depict several schematic setups of a system for monitoring a position and/or movement of an object;

FIG. 2 schematically illustrates a system according to a general embodiment of the present invention;

FIG. 3 schematically illustrates a system according to a further embodiment of the present invention;

FIG. 4 schematically illustrates a set-up for reducing environmental interference;

FIG. 5A schematically illustrates a set-up for distinguishing reflections from a survey reflector from other reflecting elements;

FIGS. 5B to 5E schematically illustrate the principle of FIG. 5A;

FIG. 6 schematically illustrates a schematic measurement set-up according to an embodiment;

FIG. 7 schematically illustrates an arrangement enabling identification of survey reflectors, according to an embodiment;

FIG. 8 depicts a functional overview of a camera that can be used in the present invention;

FIG. 9 shows an exemplary housing for the cameras according to the present invention; and FIG. 10 shows a flow chart of an example of the functioning of the system.

Figure 11:
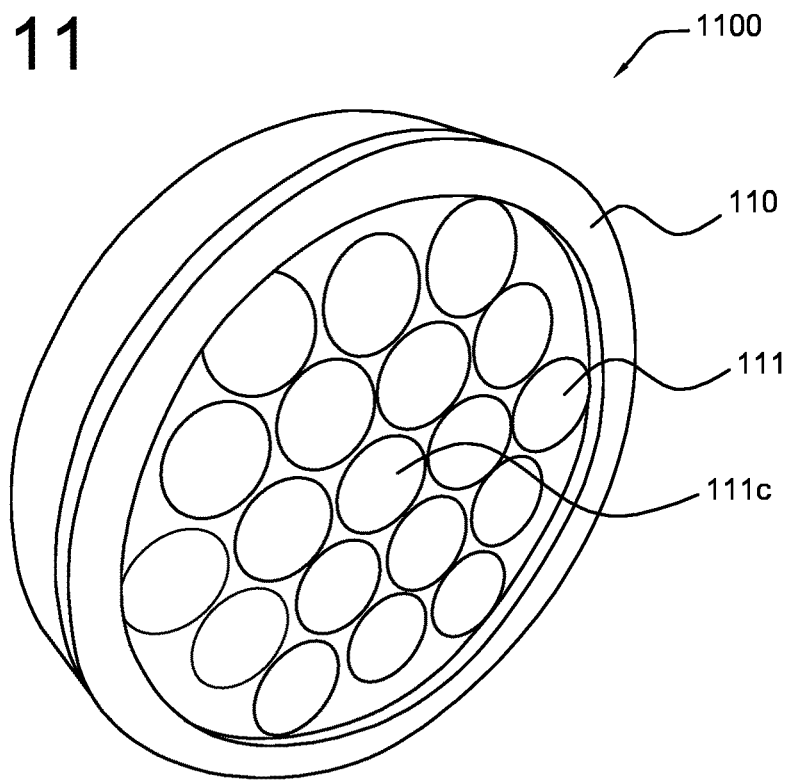
Figure 12A:
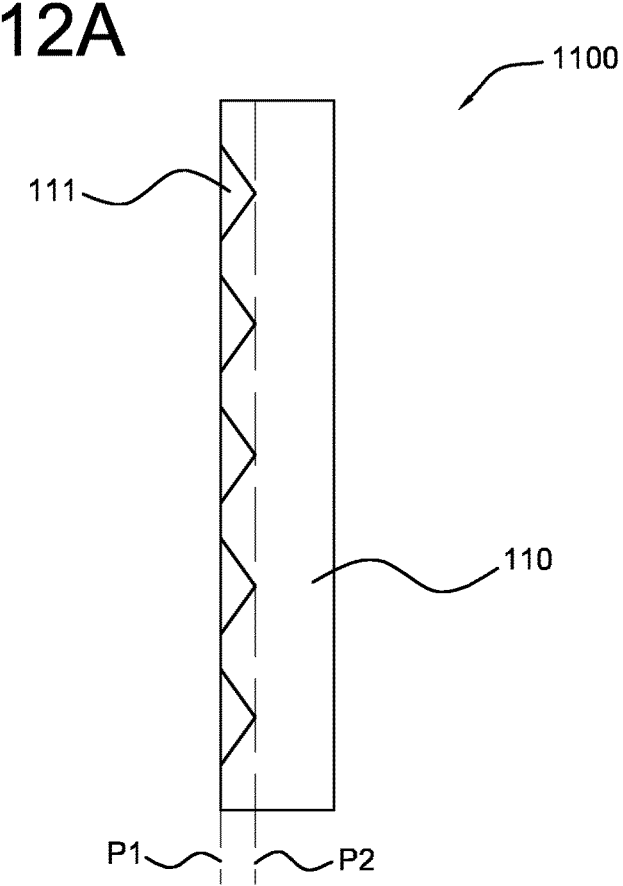
Figure 12B:
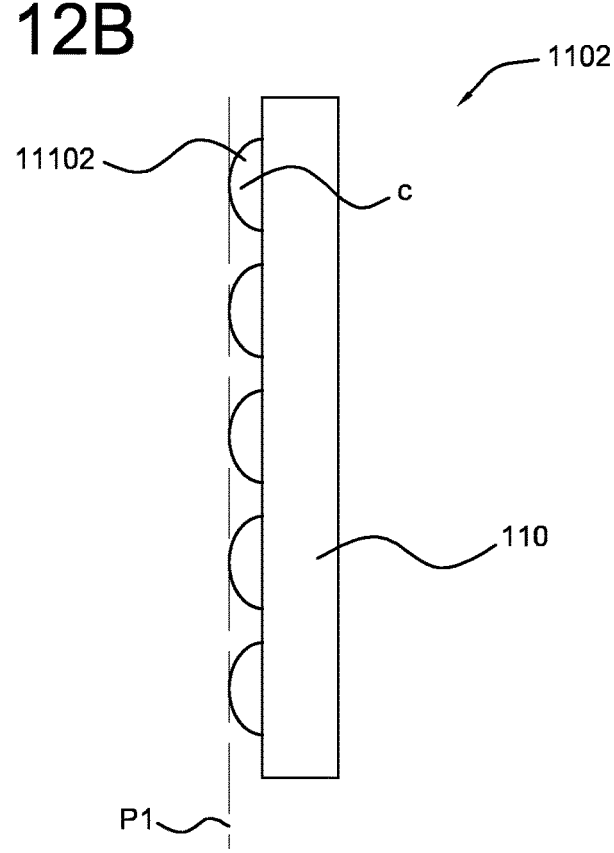
Figure 12C:
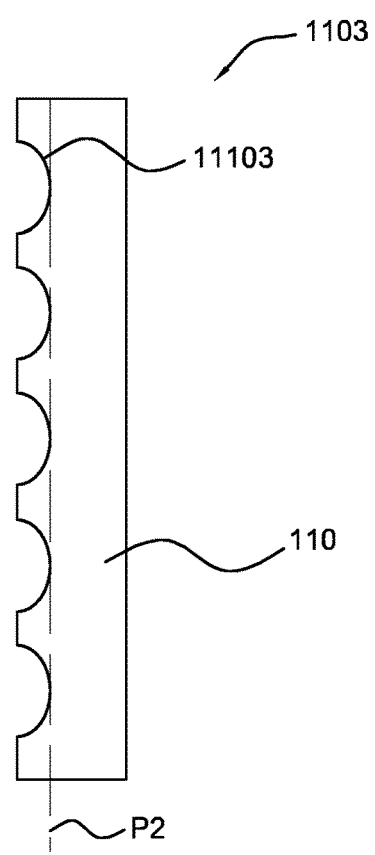
Figure 13A:
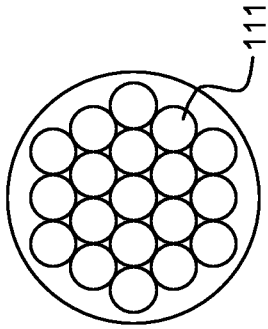
Figure 13B:
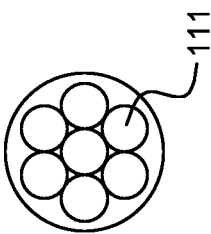
Figure 13C:
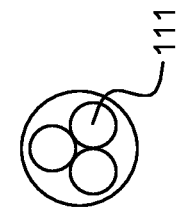
Figure 13D:
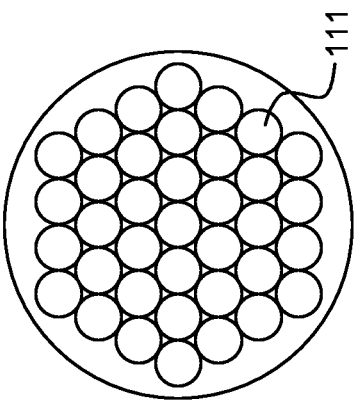
Figure 13E:
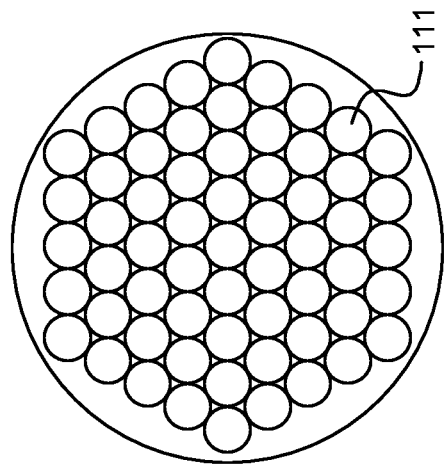
Figure 14A:
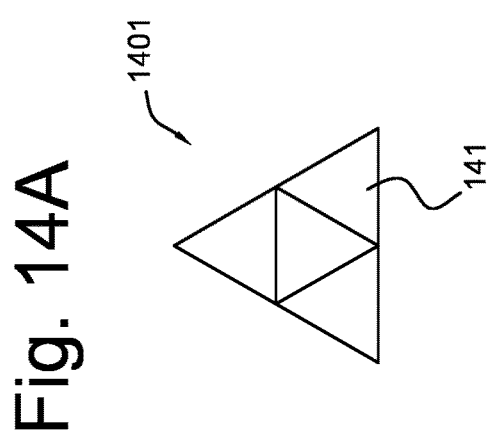
Figure 14B:
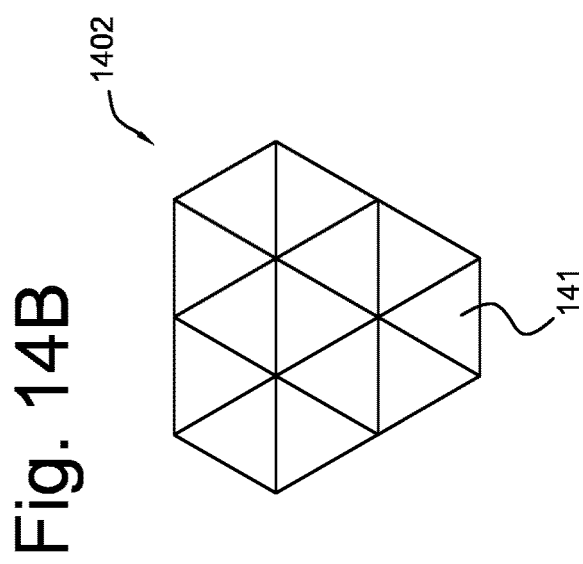
Figure 14C:
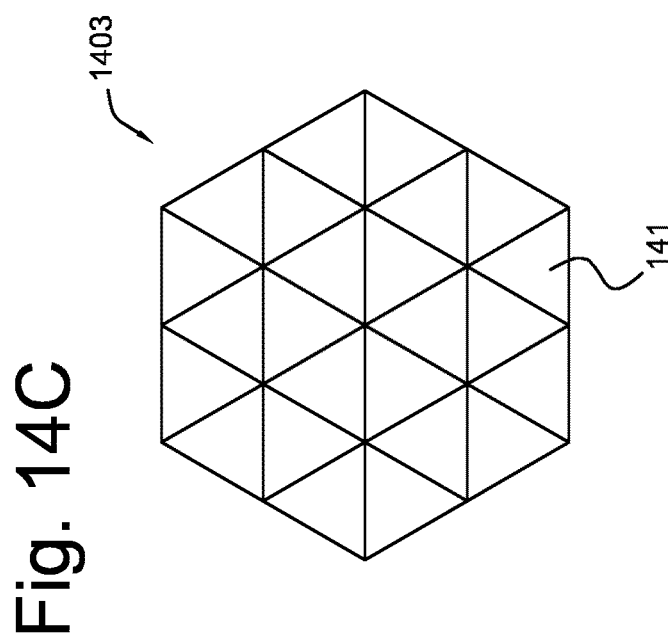
Figure 15:
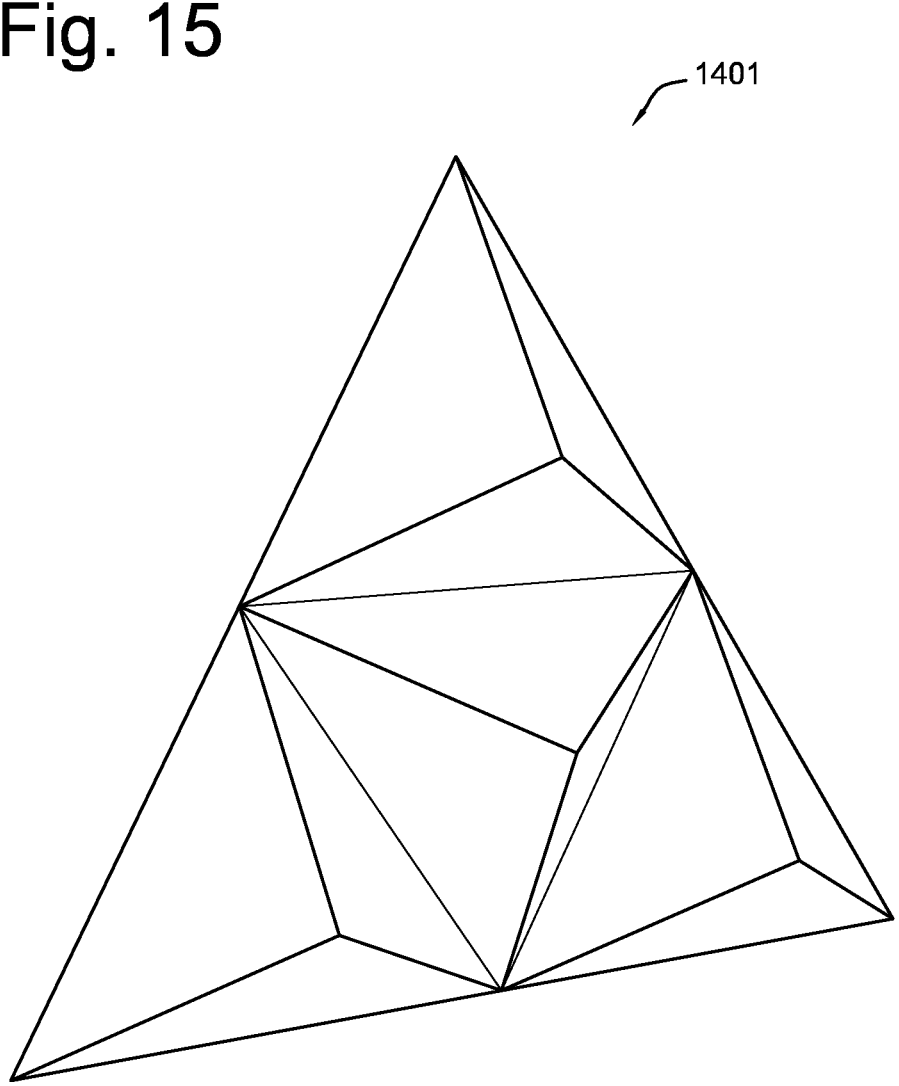

FIG. 11 shows a target unit according to an embodiment of the present invention;

FIGS. 12A to 12C schematically illustrates cross sections of the target unit of FIG. 11 according to different embodiments;

FIGS. 13A to 13E shows arrangements of the survey reflectors in the target unit according to embodiments of the present invention;

FIGS. 14A to 14C shows arrangements of the survey reflectors in the target unit according to embodiments of the present invention;

FIG. 15 provides a rear view of the arrangement of FIG. 14A.

DESCRIPTION OF EMBODIMENTS

In general, the present invention relates to surveying objects or tracking of movement of objects by tracking one or more survey reflectors attached to the object. More specifically, the present invention is directed to apparatuses comprising cameras provided with one or more light sources configured for emitting a divergent light beam, for surveying and/or tracking of positions on objects.

Although the illustrated embodiments are described using a camera having an optical entry system, i.e., camera objective, formed by non-refractive element in the form of a pin-hole at the camera objective, it should be understood that the non-refractive element may alternatively be any of the non-refractive elements mentioned herein above. Alternatively, the optical entry system can be formed by a lens system, such as a lens system comprising a single lens. Analogously, although the embodiments are described using a prism as the survey reflector, it should be understood that a different reflective element, for example another type of prism or a hollow mirror, could also be used.

FIG. 1A shows a possible setup of a system in which an object 3 is monitored. The system comprises a sensor apparatus, like a camera 7. The system also comprises a plurality of survey reflectors 1 which are attached to the object 3 at a plurality of locations. The object 3 is shown as comprising one or more buildings to which the survey reflectors 1 are fixed. However, the object 3 may alternatively be any other construction like a tower, a tunnel (FIG. 1B), or a bridge (FIG. 1C), but also a vehicle (like a boat on land), or a natural object like a big rock.

The object 3 is monitored by monitoring or measuring the positions of the survey reflectors 1. By monitoring their positions over time, movement of the whole or parts of the object 3 can be detected. Preferably also an amount, degree and/or direction of the movement can be determined. Thereby, the status, such as the stability or integrity, or the mechanical properties, of the object 3 can be monitored.

One camera 7 is shown. However, the system may comprise more than one camera 7.

According to the invention, the camera 7 is arranged to generate and transmit a diverging light beam 5, also referred to as first beam, to the plurality of survey reflectors 1. The survey reflectors 1 reflect the part of the diverging light beam 5 impinging thereon, thereby forming reflected beams 6 which are reflected back to the camera 7. As will be described in more detail further herein below, the light beam 5, generally substantially cone-shaped, has a solid angle, Ω1, covering the field of view of the camera 7. Thereby, the plurality of survey reflectors 1 can be monitored substantially simultaneously.

FIG. 1B shows an implementation in a tunnel 3. A railway with railway sleepers 12 runs through the tunnel 3. Both the tunnel wall and the railway sleepers 12 are provided with survey reflectors 1. Camera 7 is arranged to view all survey reflectors 1 in its field of view.

FIG. 1C shows an implementation on a bridge 3. The bridge 3 is provided with a plurality of survey reflectors 1. Camera 7 is arranged to view all survey reflectors 1.

The survey reflectors 1 illustrated in FIG. 1A to 1C may be realized by single, high-precision survey reflectors, such as survey prisms. Alternatively, multiple survey reflectors, advantageously realized by a target unit 1100, 1101, 1102, 1103 described with reference to FIGS. 11 and 12A-D herein below, may be provided at each location.

FIG. 2 provides a schematic illustration of the measurement principle of a system 20 for monitoring a plurality of locations on an object 3 according to a first aspect of the invention. For ease of illustration and understanding of the optical principle, FIG. 2 illustrates the system 20 as monitoring one survey reflector 21. However, as illustrated in e.g. FIGS. 1A to 1C, the system 20, in particular the camera 27 thereof, can be used for monitoring a plurality of such survey reflectors. The survey reflector 21 is formed by a prism in the illustrated embodiment, although other types of reflectors, for example a hollow mirror, could also be used. Further alternatively, a target unit as illustrated in FIGS. 11 to 15, comprising a plurality of such reflectors, can be used instead of the single reflector 21.

The system 20 comprises a camera 27 and a processing unit 29, which may be comprised or arranged within the camera 27. Alternatively, it may be arranged remotely from the camera 27.

The camera 27 comprises a first light source 22 emitting a diverging beam 25, also referred to as first divergent beam. The first light source 22 generally comprises a light emitting diode, LED. The first beam 25 has a first solid angle, Ω1, which is preferably large enough to cover substantially the entire field of view of the camera 27. Alternatively, as described above, a plurality of first light sources 22 may be provided, in order to cover substantially the field of view of the camera. In such embodiment, the solid angle of each beam does not necessarily cover the field of view, as long as the assembly of beams substantially cover the field of view. Thereby, all survey reflectors 21 located within the field of view of the camera, i.e., seen by the camera, are irradiated with the first beam 25 without moving, rotating or scanning the camera or light beam (with the possible exception of one or more survey reflectors being shadowed by an obstacle, such as a pedestrian or vehicle in the case of monitoring a building as shown in FIG. 1A or a train in the case of monitoring a tunnel as shown in FIG. 1B). In the case where a plurality of first light sources 22 are provided, all survey reflectors will be irradiated by a beam from at least one of the light sources.

For some embodiments, the first divergent beam 25, or the accumulation of first divergent beams emitted by a plurality of first light sources 22, only partially covers the field of view of the camera. For many surveying applications this may be sufficient. The partial coverage may, for example, be at least 10%, or more, in some embodiments at least 50%, depending on the application.

The first beam 25 is preferably amplitude modulated, thereby exhibiting a defined variation in time of its amplitude. Alternatively and/or additionally, other types of coding may be applied to the first beam, as described in more detail in the Summary section herein above. By applying appropriate filtering techniques during image processing of the data, as described above, environmental influences on the measurements, such as interference by ambient light, can be reduced.

The survey reflector 21 will reflect the part of the first beam 25 which it receives, forming a reflected beam 26 which is reflected back towards the camera 27.

The apparatus 20 further comprises an image sensor 24, arranged for receiving reflected light, i.e. the part 261 of the reflected beam 26 which enters the camera 27. As a result of the reception of the reflected light 261, the image sensor 24 generates data, in preferred embodiments in the form of a two-dimensional image.

Between the image sensor 24 and the first light source 22, or at least the emitting surface thereof, a body 28 is arranged, which in the illustrated embodiment is substantially planar. The body 28 is non-transparent to light, and comprises an optical entry system, in the illustrated embodiment in the form of a non-refractive element such as pinhole 23, forming the objective of the camera. In the illustrated embodiment, the body 28 forms part of a housing of the camera.

Although the description herein will be focused on the optical entry system being formed by a pinhole, other types of non-refractive elements, in particular as described in WO 2019/143250 A1, may be equally well suitable, as may refractive elements, such as a single thin lens.

The processing unit 29 is configured to determine, generally by image processing of the data provided by the image sensor, a location of each survey reflector from the data and to detect a movement of one or more of the plurality of survey reflectors based on a comparison of the determined location of each survey reflector with previously determined locations thereof.

By simultaneously irradiating all survey reflectors located within the field of view of the camera with the divergent beam generated by the one or more first light sources, all survey reflectors can be measured substantially simultaneously, without the need to move the camera and/or scan the first beam. Thereby, the complexity of the system and the time required for measurement can be reduced. The survey reflectors are passive reflective elements, hence do not require any power source.

The first light source 22 is arranged at a first distance, D1, from the pinhole 22. To an approximation, the first distance D1 is smaller than a diameter, such as a diameter, D, of the surface area, or aperture, of the survey reflector 21 on which the first beam 26 is incident. If the light source would be located outside this radius, the observer, i.e. the pinhole 23, would not be able to 'see' the reflection of the first light source, as follows from the principles of optics. The light-source 22 can, to a good approximation, be assumed to be a point-source. A perfect survey prism will reflect a diverging beam emitted by the first light source (if the beam-width is wide enough to cover the entire aperture of the prism) back to the (point) source. The apparent distance of the reflected source to an observer, located at the same position as the source, is twice the distance of source to prism. The beam-width, or solid angle, (in degrees or steradians) of the reflected beam is limited by the aperture of the prism and the distance between the source and the prism. The diameter of the reflected beam spot at the location of the source is twice the diameter of the aperture of the prism (this is because the virtual source 22v is at twice the distance from source to prism). The center of the spot of the virtual source 22v is located at the same position as the point source 22. Therefore, an observer (or light-receiver) at the same distance from the prism as the light-source, will only be able to 'see' the reflected source if he (or the light receiver) is located within a radius of the diameter of the prism from the light-source. In other words, reflections 251 of the first beam 25 in the prism 21 will only appear at the pinhole 23 if the first light source 22 is located within a distance from the pinhole not more than the diameter of the prism. This principle will be used in different embodiments for distinguishing and/or reducing the influences of ambient light and/or reflections of the first beam from other surfaces than the survey reflectors, as will be described in more detail further below.

FIG. 3 schematically illustrates a system 30 according to a further embodiment. The system 30 is similar to the apparatus 20 illustrated in FIG. 2, but the camera 37 is provided with an additional light source, also referred to as second light source, 322, in addition to the first light source 321. The second light source 322 is analogous to the first light source, and is arranged at a second distance D2 from the pinhole 33, which is larger than the first distance D1. In analogy to the approximate definition of the first distance, D1, the second distance D2 is larger than the diameter D of the prism 31. The first and second light sources, 321, 322, may be located on opposite sides of the pinhole 33, although this is not required. Analogous to the first light source 321, the second light source 322 also emits a divergent light beam, in the form of a second beam 352 having a second solid angle, Ω2, preferably sufficiently large to cover the field of view of the camera. Further analogous to the embodiment of FIG. 2, a plurality of first and second light sources 321, 322 may be provided. Following from the theory summarized above with reference to FIG. 2, this means that the reflection 362 of the second light source 322 by the prism 31 will not enter through the pinhole 33, while the reflection of the first light source 361 will (as described above with reference to FIG. 2). As can be seen, the virtual source 322v corresponding to the second light source 322 will not be visible at the pinhole 33. Thereby, according to embodiments of the invention, this set-up facilitates suppression of reflections from false targets.

Elements or surfaces, other than the survey reflector 31, located in the field of view of the pinhole 33 and irradiated by the first beam 321, may also reflect light, either diffusely or as a mirror like surface. These reflections may interfere with the reflections from the prism 31 or even generate false targets. In order to obtain reliable measurement results, i.e., reliable and relevant monitoring of the object to be monitored, it is desired to be able to distinguish between such unwanted reflections and reflections of the first beam from the prisms.

This can be achieved by applying a first code to the first beam, for example by amplitude modulating the first light beam 351, emitted from the first light source 321, with a specified modulation frequency, and providing a second code to the second beam, As described above, only reflections of the first light source 321, and not of the second light source 322, in the prism, will reach the pinhole. Other elements in the field of view will reflect light of both sources back into the pinhole.

By giving the light emitted by first and the second light sources 321, 322, respectively, different codes, code 1 and code 2, respectively, signals originating from the first and second light sources, respectively, can be separated during processing of the data from the image sensor. This has been described in more detail in the summary section herein above.

By subtracting the two images obtained after filtering for the first and second code, respectively, the reflection caused by the prism 31 can be obtained. From the image resulting from the subtraction, the position and/or movement of the prism 31 can be determined.

Alternatively, an optical bandpass filter might be provided at, i.e. in front of, the prism 31, allowing passage of light of one wavelength but not the other. The first light beam, having a first wavelength and provided with a first code, will be reflected by the prism, but not the second light beam, having a second wavelength and provided with the second code. Thereby, the prism will only reflect light from the first light source 321, whereas other elements in the field of view of the camera will reflect both light from the first light source 321 and from the second light source 322. This method will work also in case the second light source would be located at a distance from the pinhole 33 smaller than the diameter of the prism.

In a further embodiment, illustrated in FIG. 4, the influence of environmental interference on the measurements of the survey reflectors is reduced by fitting the survey reflector 41 with an active modulator 412, for example a liquid crystal modulator, that modulates the amplitude of the reflected light 46 for a particular frequency that can be distinguished from constant, i.e., ambient, light. Also for this embodiment one light source 42 suffices. The light beam 45 emitted thereby does not have to be modulated, although this can still be the case.

In the embodiment illustrated in FIG. 5A, the camera 57 comprises a first light source, 521, and an additional light source, herein also referred to as third light source, 522. Both light sources are located within a distance, d, from the pinhole 53. Using the approximate definition set out above, the distance d does not exceed the diameter, D, of the survey reflector 51. Hence, parts of the reflected beams 561, 562 of both the first light beam 521 and the additional light beam 522, respectively, reflected by the survey reflector 51 will enter the pinhole 53. Due to their different codes the respective projections on the image sensor 54 can be distinguishable using image processing. The light sources 521, 522 may advantageously be located on opposite sides of the pinhole 53, although this is not required. The camera 57 may additionally be provided with one or more second light source located further from the pinhole, as described with reference to FIG. 3, the details of such combination are however omitted herein.

As illustrated in FIGS. 5B to 5E, this set-up enables distinguishing between reflections from a prism 51, or hollow mirror, forming a survey reflector, and reflections from other mirror-like surfaces, also referred to as false targets, located within the field of view of the camera 57. To this end, the first beam 521 is provided with a first code, and the beam 522 is provided with a different code. From the properties, in particular the presence or absence of mirror symmetry, of the image resulting from the reflections of the two light sources it can be distinguished if the reflections originate from a prism or a different mirror-like surface.

If reflected from a prism 51, as illustrated in FIG. 5B, a first light source 521, e.g. a LED, right of the pinhole 53, will create a virtual light-source 521v appearing at the left and the light source 522, which may be an additional LED, left of the pinhole 53 will create a virtual light-source 522v to the right. In other words and more generally, the image of the two light sources is mirrored with respect to the center of the prism.

Figure 5C:
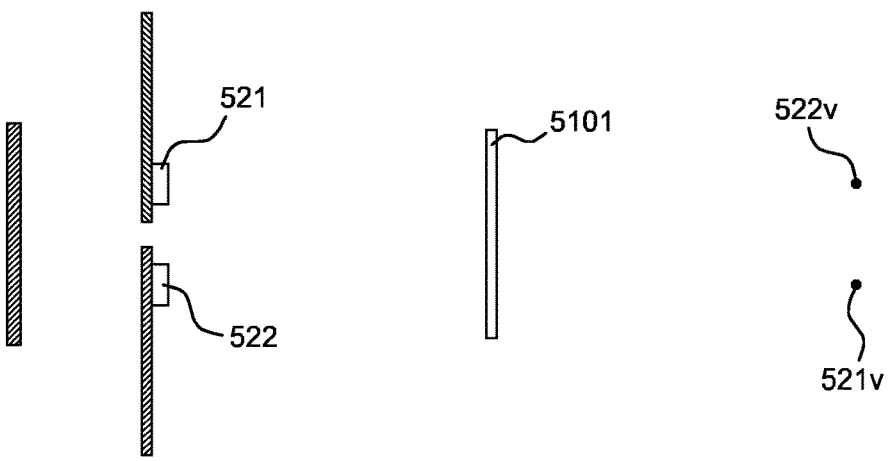
Figure 5D:
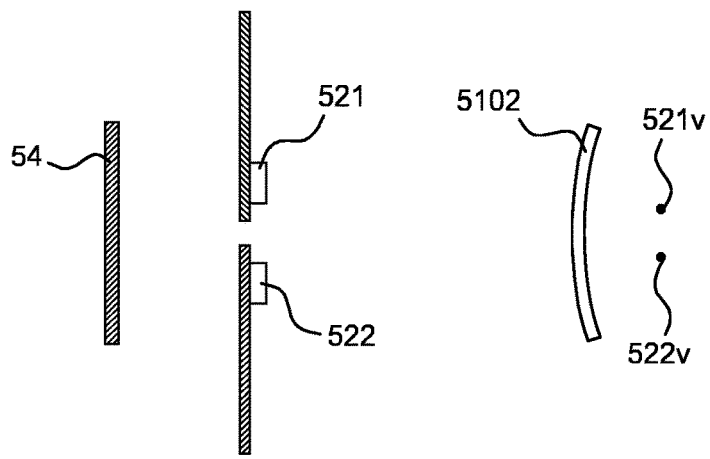

However, if reflected from a flat mirror 5101, as illustrated in FIG. 5C, or from a spherical, i.e. convex, mirror 5102, as illustrated in FIG. 5D, this is not the case. In these cases, the image will not be mirrored.

Figure 5E:
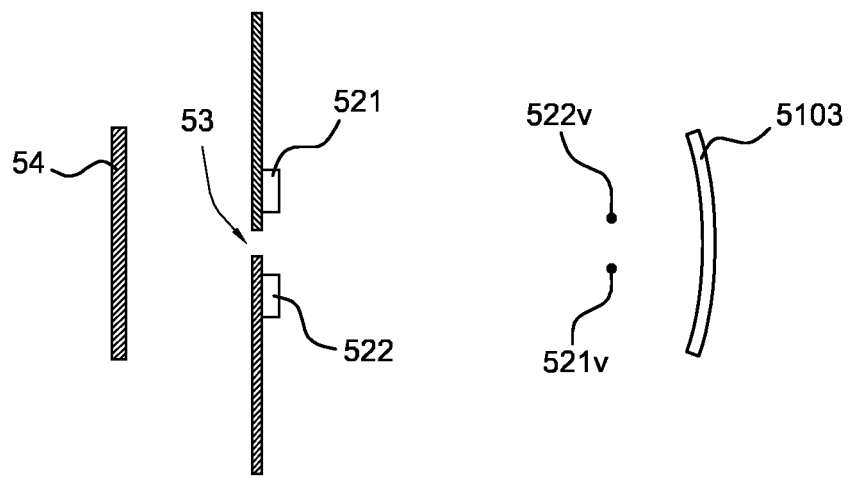

In the case of a hollow, i.e., concave, mirror surface 5103, as illustrated in FIG. 5E, the image will only be mirrored if the two light sources are located outside the focal distance of the mirror.

Further, from the distance between the two images, or targets, recorded by the image sensor 54 in the embodiment illustrated in FIG. 5A, the distance $D_T$ between the camera and the survey reflector can be determined. The distance between the images i1, i2 recorded on the image sensor 54 will depend on the distance between the two light sources, which is known, the focal distance $D_f$ of the camera (i.e. the distance between the image sensor and the pinhole, which is also known), and the absolute (two-dimensional) angle of the image sensor with respect to the target, which can be measured according to another principle as described herein and/or as known to the skilled person, and the distance, $D_T$, between the pinhole and the prism, which can hence be determined.

Another measurement set-up, enabling determining the distance between the camera and the different survey reflectors is illustrated in FIG. 6. In this set-up, two cameras 67A and 67B are used, located at different camera positions but viewing the same scene, i.e., the same set of survey reflectors 61. These cameras 67A, 67B, may be any one of the cameras as described above, and hence operate according to any one of the methods described above. The cameras are arranged such that their respective optical axes are arranged at an angle α, which is preferably known, with respect to one another. By triangulation measurements, the distance from the cameras to the survey reflectors 61 can be determined, in a way as will be understood by the skilled person. Furthermore, three dimensional coordinates of the survey reflectors 61 can be determined, as has been described in the Summary section of this document.

Furthermore, in each of the embodiments described above, it may be desirable to identify each of the survey reflectors prior to starting a measurement or monitoring session, and/or while monitoring a set of survey reflectors over time, in order to distinguish reflections from the different survey reflectors from one another. This can be enabled by an embodiment as illustrated in FIG. 7. It should be noted that the embodiment of FIG. 7 can be applied or incorporated in each of the embodiments described herein above.

As illustrated in FIG. 7, the survey reflector 71 is provided with, and/or fitted or combined with, a light receiver 71 for receiving a part of the first beam 75 emitted by the light source 72 of the camera 77, and a microcontroller 719, coupled to or forming part of the light receiver 714 for detecting and/or processing signals generated by the light receiver upon receipt of light. Further, an identification unit light emitter 712, for example a LED, is provided at the survey reflector and coupled to the microcontroller 719. The light receiver 714, the microcontroller 719, and the light emitter 712 may form a survey reflector identification unit 716. The processing unit 79 associated with the camera 77, is configured to control the first light source 72 such that a signal may be imposed on the first light beam 75. This signal may comprise an identification request. When such request signal is received by the light receiver 714, the identification unit light emitter 712 emits an identification signal, for example in the form of a code which is emitted for only a short time. When this identification signal, which is unique for each survey reflector, is received at the image sensor 74 of the camera 77, the survey reflectors can be identified.

The survey reflector 71 and the survey reflector identification unit 716 may be arranged in a survey reflector unit 718, which may also be referred to as a beacon.

The object 3 may be provided with a plurality of survey reflector units 718 at different locations thereof, for monitoring these locations. In the illustrated embodiment, the survey reflector 71 is provided by a prism. However, it can be understood that another type of reflector may be equally suitable, for example a hollow mirror, also referred to as a cat's eye.

By configuring the processing unit 79 to cause the camera 77, in particular the light source 72 thereof, to send out an identification request to all survey reflector units within its reach, each of these can be uniquely identified by an identification signal sent out by the identification unit 716 of the respective survey reflector units 718.

Now, the components according to embodiments of the camera 7, will be described in more detail, in particular with respect to their functional aspects. This description applies analogously to all cameras 27, 37, 47, 57, 67A, 67B, 77 described in the different embodiments herein above.

FIG. 8 shows an example of a camera 7. The example camera 7 has a processing unit 9 which is connected to non-refractive optics 101, an image sensor 120, a clock 123, a memory 15, one or more position and/or orientation measurement components 16, an output unit 17, an input unit (or user interface) 19, electronic networking module(s) 109, and one or more light sources 102. The non-refractive optics 101 is shown to be connected to the image sensor 120. This latter "connection" need not be a physical connection. Here, "connection" is intended to refer to a situation where the non-refractive optics 101 is arranged to receive ambient light such that the received ambient light is received by the image sensor 120. Not all functional elements shown in FIG. 8 need be present as can be understood from the embodiments described herein above.

All connections intended for transmission of data may be physical connections (wires) however, alternatively they may be wireless and based on transmission of electromagnetic/light radiation.

The non-refractive optics 101 may be any of the types of non-refractive optical elements as described herein above. In preferred embodiments, the non-refractive optics may comprise one or more pinholes. The diameter of a pinhole may be in a range between 50 and 400 μm. Alternatively, as described above, the non-refractive optics may be replaced by a lens, which preferably is a thin lens allowing temperature modulation at low computation efforts.

The processing unit 9 may be any suitable processing unit known from the art.

The image sensor 120 preferably comprises a set of light sensitive elements (pixel) arranged in a 2D matrix forming a camera's image plane, like a CCD-sensor or a CMOS-sensor. The image sensor 120 is arranged to receive the light beams 6 as entered through the non-refractive optics 101. Each light beam 6 will be focussed on a subset of these light sensitive elements. Each such subset corresponds to a solid angle of one incoming light beam 6, i.e., both an angle of incidence in a horizontal and an angle of incidence in a vertical plane relative to the earth. Angles of incidence can, of course, also be measured relative to another object than the earth, like a geostationary satellite. As long as both the camera 7 and the survey reflectors 1 remain at fixed positions, these subsets are static per survey reflector 1.

In an alternative embodiment a line sensor can be used in combination with an optical slit as objective, rather than a pinhole. The optical slit, in such an embodiment, is oriented essentially perpendicular to the line sensor's lateral direction. Such alternative embodiments can provide measurements of angles in one dimension. In order to increase the number of dimensions available to be measured, two or more of such devices equipped with line sensors can be arranged in various different orientations. For example, two of such devices can be arranged in a perpendicular fashion, thereby allowing for measurements, similar to measurements performed with a 2D matrix sensor. Such linear sensor arrangements would have the advantage of consuming substantially less power than a device employing a 2D matrix sensor.

Optionally, a temperature control system 103 may be provided, in order to reduce thermal influences on the measurement data. The thermal capacity of the non-refractive optics 101 is relatively low when compared to a camera 7 using a lens system instead of the non-refractive optics 101. Thermal stability can be improved by implementing a temperature control system in the form of a thermostat 103. FIG. 8 shows an embodiment with a reversible (i.e. configured for both cooling and heating) Peltier element 103, to the non-refractive optics 101. The Peltier element 103 is connected to and its temperature is controlled by processing unit 9 such that non-refractive optics 101 is kept at a predetermined temperature. Alternatively, thermal stability can be increased by the design of the camera housing, in particular via the material used therefore, and/or by measuring the temperature at various locations therein and using a model accounting for thermal influences during processing of the data from the image sensor.

In the below, some general aspects of the systems described herein above and methods of operation thereof will be summarized.

If the system is equipped with two or more cameras, e.g. as illustrated in FIG. 6, the technology as described here can be used to measure how far the survey reflectors 1, 61 are from the cameras. This can be done by triangulation measurements where one baseline is known. Measuring a distance between the camera 7, 27, 37, 47, 57, 77 and the survey reflectors 1 can also be done with other distance measuring techniques like time-of-flight measurements.

The image sensor 24, 34, 44, 54, 74, 120 converts the received light beams 6 into an image. The image is a set of electronic signals, here called pixel signal. Each pixel signal is generated by one light sensitive element and has a value depending on the light intensity of light received by the light sensitive element. Thus, the pixel signals may also relate to the object 3 to which the survey reflectors 1 are attached and its surroundings.

The image sensor is positioned such that the light entering the camera through the non-refractive element forms a diffraction pattern on the image sensor. The diffraction pattern will depend on the properties of the non-refractive element, and will show up as dark or bright regions on the image sensor depending on the distance and angle of the respective pixels of the image sensor to the non-refractive element. By integrating a plurality of data frames, each comprising a number of pixels, typically at least 100, measurement results of high resolution can be achieved.

In embodiments using refractive optics, such as a lens, the image sensor is preferably, positioned such that its light sensitive elements are in the vicinity of the focal plane of the lens. In another preferred embodiment, the image sensor 120 is positioned at a position within the focal distance of the lens such that the image is de-focused to a certain amount, resulting in a beyond infinity focus condition. In such an embodiment, the image processing may include super-resolution imaging based on defocusing techniques, thereby enabling sub-pixel resolutions. A resolution of 1/100 or even better of a pixel can then be obtained.

The processing unit 9 is arranged to receive the pixel signals from the image sensor 120 and store them in memory 15. The pixel signals may be stored by processing unit 9 as a single picture, preferably with a time stamp and/or position stamp indicating the position of camera 7. However, preferably, the pixel signals are stored by processing unit 9 as a series of pictures together forming a video, in which each picture is provided with a time stamp and/or position stamp indicating the position of camera 7.

Clock 23 provides clock signals to processing unit 9, as known to a person skilled in the art. The clock signals are used for the normal processing of processing unit 9. Processing unit 9 may base the time stamp on these clock signals. However, camera 7 may also be equipped with a GNSS unit receiving time signals from a satellite or may receive time signals from another suitable source.

Memory 15 may comprise different types of sub-memories, like ROM (Read Only Memory)/Flash types of memory storing suitable program instructions and data to run the processing unit 9. Also, memory will comprise suitable RAM (Random Access Memory) types of memory for storing temporary data like the data received from image sensor 120. Memory 15 may also comprise cache type memory. Some or all of the sub-memories may be physically located remote from the other components. Processing unit 9 may also be arranged to send all pixel signals to a remote unit via electronic networking module(s) 20 for external storage and processing. A local copy of these pixel signals may then, but need not be, stored in a local memory 15 within camera 7.

Memory 15 stores initial position data indicating the initial position of camera 7. Such initial position data may have been established by using a theodolite and then be stored by a user. Such initial position data can also result from a measurement made by the camera 7 itself. E.g., the camera 7 can collect consecutive pictures from known "blinking" light sources installed on tall air traffic obstacle markers having well known locations. Such obstacle markers may be placed in defined vertical distances on tall structures and thereby allow for triangulation. Memory 15 also stores a camera ID identifying camera 7 and being used by processing unit 9 in external communications with other devices to identify itself to those other external devices.

Position and/or orientation measurement components 16 may include one or more accelerometers and/or gyrometers/gyroscopes, as is known to a person skilled in the art. They may also include the above mentioned GNSS unit. Such accelerometers and/or gyrometers/gyroscopes measure the camera's own motion and derive an updated camera position and orientation from such measurements. The updated camera position and/or orientation is then stored by processing unit 9 in memory 15. By doing so, changing camera positions and/or orientations can be taken into account when measuring the position of the one or more survey reflectors 1. Accuracy may be in the order of a few 1/1000 degrees. Tests have shown 2 milli degrees peak-to-peak. Moreover, a three-axis accelerometer package can also measure the direction of earth gravity when static. A 3D gyro package of sufficient performance can measure the direction of the earth rotation axis (also when static).

Output unit 17 may comprise one or more sub-output-units, like a display and a speaker.

Input unit 19 may comprise one or more sub-input-units like a keyboard and a microphone. The display and keyboard may be made as two distinct touch screens. However, they may also be implemented as a single touch screen.

Electronic networking modules 20 may comprise one or more of LTE (Long Term Evolution), Ethernet, WiFi, Bluetooth, Powerline communication, Low Power Wide Area Network (e.g. Lora™ and Sigfox™), and NFC (Near Field Communication) modules. Technology known from the IoT (Internet of Things) may be used, as well as any proprietary communication protocol.

The at least one light source 102 comprises at least one light source like a Light Emitting Diode (LED) source configured to generate light. Processing unit 9 is arranged to control each LED source such that they generate a light beam.

As shown in FIG. 9, the camera can be provided with a housing configured to withstand high temperature and/or high-pressure environments (for example a deep sea or geothermally active environment) without introducing significant error due to deformation of the optical elements. The housing (which can be used with all of cameras 27, 37, 47, 57, 67A, 67B, 77 described in the different embodiments herein) comprises at least one wall 600 surrounding a void 610. The image sensor 120 is mounted within the void 610. The housing is closed by a front wall or cover, also referred to herein as a body, in which a pin hole 102 (or another optical entry system) is provided. The pin hole 102 is configured to form an image at the sensor 120 as described herein above. The first, second and third light sources described herein above may be arranged on or in the front wall or body, facing in the external direction of the housing such as to emit its light beams in an external direction. The housing may further be provided with various further features and/or elements, e.g. as appropriate to the specific environment in which the camera is to be used.

The basic idea of the apparatus, and the method for monitoring an object using the apparatus, is that camera 7, or any one of the cameras 27, 37, 47, 57, 67A, 67B, 77 described in the different embodiments herein, is arranged on a fixed position such that it is static. Then, the static position is known and stored in memory 15 accessible by processing unit 9 in camera 7.

When all survey reflectors 1, or, equally, survey reflectors 21, 31, 41, 51, 61, 71 described in the various embodiments herein above, or the target units 1100, 1101, 1102, 1103 described herein further below and illustrated in FIG. 11-15, have been installed they have an initial position which may be stored in the camera's memory 15.

Thus, when the system starts, the camera knows all initial positions of survey reflectors which correspond to an initial position and orientation of object 3 to which the survey reflectors are attached.

The processing unit 9 is arranged to calculate an initial solid angle of incidence of each of the reflected light beams 6. I.e., received reflected light beams are imaged, via the non-refractive optics, on one or more light sensitive elements of image sensor 120. Processing unit 9 determines which one these light sensitive elements are and then establishes the solid angle of incidence of the corresponding light pulse. Techniques to do so are known to persons skilled in the art and need no further detailed explanation here.

When the object 3 is stable, i.e., does not move, the positions of all survey reflectors 1 are also stable. Consequently, the solid angle of incidence of each reflected light beam on the camera's image sensor is fixed. However, as soon as the object 3 moves, or parts thereof, this solid angle of incidence of the reflected light beams 6 changes. The processing unit 9 is arranged to calculate this change of the solid angle per light beam 6.

FIG. 10 shows an example of consecutive steps of image processing according to embodiments of the invention.

The camera 7 receives the reflected light beams 6 from a survey reflector 1, 1100, 1101, 1102, 1103, 1401, 1402, 1403 that is projected onto the image sensor 120. FIG. 10 depicts a flow of processes according to an embodiment, performed by processing unit 9, to extract relevant survey reflector data. This flow of processes applies equally to any one of the embodiments described herein above. FIG. 10 describes the basic processes, it should be understood that further details may be added to one or more of the process steps, and/or that further process steps may be added to further optimize the method, in particular as has been described herein above and/or as will be understood by the person skilled in the art.

The first step, 1001, in the processing is to record, or capture, at least two, but preferably many images frames, or raw data frames, in a sequential order. Each image frame is essentially a 2D array of light values. By capturing a sequence of image frames, a 3D matrix of light values is formed. The axes in the 3D matrix are X, Y and time T. In one embodiment a sequence of 100 images are captured with an interval of 1/60 s.

In the steps 1002, digital processing is applied to the sequence of image frames, in order to enhance the data relating to one specific light source, or coded light beam, while suppressing influences of other light received by the image sensor, as described herein above. The output of this process is a 2D image. Multiple light sources with different and unique codes can be processed using the same 3D matrix of light values over time and each will produce a unique 2D image.

In step 1002a, the processed 2D image may comprise both the (diffusely) reflected light of the environment and also the reflections from the survey reflectors of the divergent light beam emitted by the one or more first light sources.

In step 1002b, the 2D processed image relating the light emitted by the second light sources may contain (diffusely) reflected light of the environment but not from the survey reflectors, as described with reference to FIG. 3 herein above.

In step 1002c, which may be optional, the processed 2D image may equally contain both the (diffusely) reflected light of the environment and also the survey reflectors, but since it comes from a light source, e.g. the one or more third light sources, with a different position than the one in 1002a, the position of the survey reflectors in the 2D image will be slightly shifted compared to the image obtained in step 1002a.

In step 1003, the two 2D images, obtained in step 1002a and 1002b, respectively, are subtracted from one another, in order to only reveal the reflected light of one particular light source by the survey reflectors. By subtracting the image obtained in step 1002b, and, optionally, the image obtained in step 1002c, from the image obtained in step 1002a, the reflections of the light emitted by the first light source from the survey reflectors can be enhanced, while suppressing influences from ambient light and from diffusely reflected light of the other light sources. The result is a single 2D image representing substantially only reflections of the first divergent light beam in the survey reflectors, while other influences have been suppressed.

In step 1004, the positions of the survey reflectors, and/or movement of one or more of the monitored survey reflectors, are determined. Light emitted by the specific light source, for example the first light source, or light having a specific coding, for example the first coding, reflected from the survey reflectors generate, for each survey reflector, a feature, or blob, preferably comprising a plurality of pixels, and, in the case of a non-refractive optics, a diffraction pattern. By correlating the features or patterns in the 2D image obtained at step 1004 with predetermined (e.g. default) features or diffraction patterns and/or with previously measured features or diffraction patterns, the positions of the survey reflectors, and/or movement of one or more thereof, can be determined.

In step 1005, the obtained data, i.e., the precise 2D coordinates of each of the reflectors, are made available to other processes. These may include a further process to correct for errors such as camera motion, temperature compensation etc., a process to estimate distance based on two light sources, storage of data, displaying of data, etc.

FIG. 11 shows a target unit 1100 according to an embodiment. The target unit 1100 comprises a plurality of survey reflectors 111 arranged in the same plane, represented by the broken line p1 or p2. As illustrated in FIG. 12A, the survey reflectors 111 may advantageously be survey reflectors 21, 31, 41, 51, 61 or 71 described herein above. As can be seen in FIG. 11, the plurality of survey reflectors 111 are symmetrically arranged, around a centre of symmetry where a survey reflector 111c is arranged. In the illustrated embodiment, each survey reflector, except for those located at the edges of the array, have six nearest neighbours. Alternatively worded, the reflectors are arranged in shifted, or offset, rows, wherein the rows may have a different number of reflectors. The survey reflectors 111 are all preferably substantially identical. The plurality of survey reflectors 111 are arranged, or mounted, in a holder 110, which can be mounted on a standard or tripod arranged on the ground, or fixed to an object or structure, such as an object 3 illustrated in FIG. 1A to 1C. The holder 110 is advantageously non-reflective and non-transparent to the light emitted by the survey camera 7.

The front face of the survey reflectors, receiving the incoming light, may be circular, whereby the hexagonal arrangement provides the most efficient arrangement of the reflectors, as illustrated in FIG. 11.

A plurality of target units 1100 illustrated in FIG. 11 may advantageously form part of any one of the systems described with reference to FIGS. 2-4, 5A, 6 and 7 herein above.

FIG. 12A illustrates a cross section along a-a of FIG. 11. As can be seen, the target unit 1100 comprises a plurality of survey prisms 111. These may advantageously be represented by the survey prisms 21, 31, 41, 51, 61, 71 described herein above.

FIGS. 12B and 12C show alternative embodiments 1102, 1103 of the target unit 1100. These embodiments differ from the embodiment of FIG. 12A by the type of survey reflectors used. However, also in these embodiments the survey reflectors may be arranged in the pattern illustrated in FIG. 11.

FIG. 12B shows a target unit 1102 comprising a plurality of convex mirrors 11102. These may be similar to survey reflector 5102 illustrated in FIG. 5D.

FIG. 12C shows a target unit 1103 comprising a plurality of concave mirrors 11103. These may be similar to survey reflector 5103 illustrated in FIG. 5E.

FIGS. 13A to 13E illustrate the close packed arrangement, similar to FIG. 11, for different number of individual survey reflectors 141. In the illustrated embodiment, the survey reflectors have a circular base facing the incoming light beam. However, similar arrangement is possible also with other shapes of the base.

In the embodiments illustrated in FIGS. 13A to 13E, arrangements are shown for a target unit comprising 3, 7, 19, 37 and 61 survey reflectors, respectively. Increasing the number of reflectors generally increases the operating distance of the system. As can be seen, the individual reflectors are arranged in an array having a centre of rotational and/or mirror symmetry, such that the intensity of the reflected light is substantially equal in different directions of the cross section of the reflected light beam. However, in certain applications, a rectangular array, or even an array of only one single line of reflectors, would also be possible.

FIGS. 14A to 14C schematically illustrate packing arrangements of prisms 141 having a triangular base. As can be seen, these can be arranged with the sides of the base of neighbouring prism abutting one another. FIG. 15 schematically shows the arrangement of FIG. 14A from the rear side.

It will be clear to a person skilled in the art that the scope of the invention is not limited to the examples discussed in the foregoing, but that several amendments and modifications thereof are possible without deviating from the scope of the invention as defined in the attached claims. While the invention has been illustrated and described in detail in the figures and the description, such illustration and description are to be considered illustrative or exemplary only, and not restrictive. The present invention is not limited to the disclosed embodiments but comprises any combination of the disclosed embodiments that can come to an advantage.

Variations to the disclosed embodiments can be understood and effected by a person skilled in the art in practicing the claimed invention, from a study of the figures, the description and the attached claims. Features of the above described embodiments and aspects can be combined unless their combining results in evident technical conflicts.

The invention claimed is:

1. A system comprising:
    a plurality of survey reflectors affixed to an object of interest at a plurality of locations;
    a camera, comprising:
        a first light sources emitting a first divergent beam having a solid angle larger than zero, wherein the first light sources is arranged such that a field in space corresponding to at least 10% of a field of view of the camera is illuminated by the first light sources;
        a second light source emitting a second divergent beam, wherein the first and the second light sources emit the first and second divergent beams simultaneously to illuminate the plurality of survey reflectors substantially simultaneously;
        an image sensor for receiving reflected light beams comprising reflections of the first and second divergent beams by the plurality of survey reflectors and for providing image sensor data; and
        a body provided with an optical entry system, the body having a first side facing an interior space of the camera and a second side facing away from the interior space, wherein the image sensor is located in the interior space and the first and second light sources are located on the second side of the body, wherein the first and second light sources are arranged at opposite sides of the optical entry system; and a processing unit configured for processing the image sensor data, wherein the processing unit is configured to determine a location of each survey reflector from the image sensor data and to detect a movement of one or more of the plurality of survey reflectors based on a comparison of the determined location of each survey reflector with previously determined locations of the plurality of survey reflectors over a period of time.

2. The system of claim 1, wherein the optical entry system comprises a non-refractive optical element forming an objective of the camera.

3. The system according to claim 1, wherein field in space is substantially equal to or larger than the field of view of the camera.

4. The system according to claim 1, wherein the processing unit is further configured for applying a first code to the first divergent beam by modulation of the first divergent beam, and for applying filtering techniques during image processing of the image sensor data.

5. The system according to claim 4, wherein the second light source is arranged at a second distance from the optical entry system which is larger than a first distance in which the first light source is arranged, wherein the second distance is such that reflections of the second divergent beam from the plurality of survey reflectors do not enter the camera through the optical entry system, and wherein the processing unit is further configured to apply a second code to the second divergent beam, wherein the second code is different from the first code.

6. The system according to claim 5, further comprising one or more third light sources configured to emit a third divergent beam, wherein the one or more third light sources are arranged at a third distance from the optical entry system which is substantially similar to the first distance, and wherein the processing unit is further configured to apply a third code to the third divergent beam, wherein the third code is different from the first code, and, if used, is different from the second code.

7. The system according to claim 1, wherein the processing unit is further configured for applying a command code to the first divergent beam, the command code comprising instructions, information and/or requests to be sent to the plurality of survey reflectors.

8. The system according to claim 1, further comprising a survey reflector identification unit to be provided at or included in a survey reflector, the survey reflector identification unit comprising:
a light receiver for receiving the first divergent beam;
a microcontroller coupled to the light receiver; and
an identification unit light emitter, configured to emit a unique identification signal in response to the microcontroller receiving a command therefore.

9. A method comprising:
monitoring, at a first camera position of a camera, a plurality of locations by:
emitting, by each a first light source and a second light source, a first divergent beam and a second divergent beam, having a solid angle larger than zero, towards a plurality of survey reflectors, wherein the plurality of survey reflectors are affixed to an object of interest at a plurality of locations and, wherein the plurality of survey reflectors are irradiated substantially simultaneously by the first divergent beam and the second divergent beam, wherein the first light source and the second light source are maintained in a substantially fixed position;

recording, by an image sensor, data representing reflected light beams comprising reflections of the first divergent beam and the second divergent beam by the plurality of survey reflectors, wherein the first light source and second light source are arranged at opposite sides of the image sensor; and determining, by image processing of the data, a location of each survey reflector from the data and detecting a movement of one or more of the plurality of survey reflectors based on a comparison of the determined location of each survey reflector with previously determined locations of the plurality of survey reflectors over a period of time.

10. The method according to claim 9, further comprising applying a first code to the first divergent beam by modulation of the first divergent beam, and applying a filtering technique when image processing the data, thereby distinguishing light originating from reflections of the first divergent beam from other light sources and/or other reflections.

11. The method according to claim 10, further comprising:
providing a body provided with an optical entry system allowing passage of light, the body having a first side and a second side, and arranging the body such that the first side faces an interior space of the camera and the second side faces away from the interior space, such that the image sensor is arranged in the interior space of the body and the first light sources are arranged on the second side of the body;
arranging the first light sources at a first distance from the optical entry system;
arranging the second light sources at a second distance which is larger than the first distance, the second light sources each configured to emit the second divergent beam, wherein the second distance is such that reflections of the second divergent beam from the plurality of survey reflectors do not enter the camera through the optical entry system; and
applying a second code to the second divergent beam by modulation of the second divergent beam, wherein the second code is different from the first code.

12. The method according to claim 11, wherein the optical entry system comprises a non-refractive optical element forming a camera objective.

13. The method according to claim 10, further comprising:
generating a first image from reflected light having the first code;
generating a second image from reflected light having the second code; and
subtracting the second image from the first image, and determining positions and/or movements of one or more of the plurality of survey reflectors from resulting image.

14. The method according to claim 11, further comprising:
providing one or more third light sources, each emitting a third divergent beam, wherein the one or more third light sources are arranged at a third distance from the optical entry system which is substantially similar to the first distance at which the first light source is arranged, and applying a third code to the third divergent beam by modulation of the third divergent beam, wherein the third code is different from the first code, and, if present, from the second code; and determining a distance between the camera and a survey reflector from a distance between a first point on the image sensor originating from a reflection of light emitted from the first light sources from the survey reflector and a second point on the image sensor originating from a reflection of light emitted from the one or more third light sources from the survey reflector.

15. The method according to claim 9, the method further comprising:

monitoring the plurality of locations at a second camera position which is positioned at a distance from the first camera position, a first viewing line between the first camera position and a reference survey reflector oriented at an angle with respect to a second viewing line between the second camera position and the reference survey reflector; and determining three dimensional coordinates of the plurality of survey reflectors based on the monitoring at the first camera position and the second camera position;

wherein the monitoring at the second camera position is performed similar to the monitoring at the first camera position.

16. A system comprising:

a plurality of survey reflectors affixed to an object of interest at a plurality of locations;

a camera configured for monitoring the survey reflectors, the camera comprising:

a first light sources for emitting a first divergent beam having a solid angle larger than zero;

a second light sources each for emitting a second divergent beam having a solid angle larger than zero wherein the first and the second light sources emit the first and second divergent beams simultaneously to illuminate the plurality of survey reflectors substantially simultaneously;

an image sensor for receiving reflected light beams comprising reflections of the first divergent beam and the second divergent beam by the plurality of survey reflectors and for providing data; and a body provided with an optical entry system, the body having a first side facing an interior space of the camera and a second side facing away from the interior space, wherein the image sensor is located in the interior space and the first and second light sources are located on the second side of the body and arranged at opposite sides of the optical entry system; and a processing unit configured for processing the data, wherein the first light source is arranged at a first distance, from the optical entry system, and the second light source is arranged at a second distance from the optical entry system which is larger than the first distance, wherein the processing unit is configured to apply a first code to the first divergent beam and a second code to the second divergent beam, wherein the second code is different from the first code, wherein the first and second code are applied by modulation of the first and second divergent beams, and wherein the processing unit is configured for applying filtering techniques during image processing of the data, and the processing unit is configured to determine, by image processing of the data, a location of each survey reflector from the data and detecting a movement of one or more of the plurality of survey reflectors based on a comparison of the determined location of each survey reflector with previously determined locations of the plurality of survey reflectors over a period of time.

17. The system according to claim 16, wherein the first light sources and the second light sources are arranged such as to illuminate a field in space which corresponds to at least 10% of a field of view of the camera, such that the first and second divergent beams are emitted towards the plurality of survey reflectors substantially simultaneously.

18. A method comprising:

providing a plurality of survey reflectors on an object of interest, each survey reflector provided at one of a plurality of locations;

monitoring the plurality of locations over a period of time by:

emitting, by each of one or more first light sources, a first divergent beam having a solid angle larger than zero towards the plurality of survey reflectors;

emitting, by each of one or more second light sources, a second divergent beam having a solid angle larger than zero towards the plurality of survey reflectors wherein the one or more first and the one or more second light sources emit the first and second divergent beams simultaneously to illuminate the plurality of survey reflectors substantially simultaneously;

recording, by an image sensor, data representing reflected light beams comprising reflections of the first divergent beam by the plurality of survey reflectors wherein the one or more first and one or more second light sources are arranged at opposite sides of the image sensor; and determining, by image processing of the data, a location of each survey reflector from the data and detecting a movement of one or more of the plurality of survey reflectors based on a comparison of the determined location of each survey reflector with previously determined locations of the plurality of survey reflectors over a period of time, wherein the method further comprises applying a first code to the first divergent beam and a second code to the second divergent beam, wherein the second code is different from the first code, wherein the first and second code are applied by modulation of the first and second divergent beams, and wherein the image processing comprises applying filtering techniques, such as to filter out data relating to reflections of the first divergent beam and/or the second divergent beam.

19. The method according to claim 18, wherein the image sensor is located in an interior space of a camera, at least partly defined by a body having a first side facing the interior space and a second side facing away from the interior space, the body comprising an optical entry system, wherein the one or more first and one or more second light sources are located on a second side of the body, wherein the one or more first light sources are arranged at a first distance from the optical entry system, and the one or more second light sources are arranged at a second distance from the optical entry system which is larger than the first distance, and wherein the first distance allows reflections of the first divergent beam from the plurality of survey reflectors to pass through the optical entry system, and wherein the second distance does not enable reflections of the second divergent beam from the plurality of survey reflectors to pass through the optical entry system.

20. The method according to claim 18, further comprising:
  generating a first image from reflected light having the first code;
  generating a second image from reflected light having the second code; and
  subtracting the second image from the first image, and determining positions and/or movements of one or more of the plurality of survey reflectors from resulting image.

21. The system according to claim 1, further comprising at least one target unit, wherein the at least one target unit includes the plurality of survey reflectors configured in at least a single plane.

22. The system according to claim 1, wherein the plurality of survey reflectors are arranged in an array having one of the plurality of survey reflectors arranged in a center of the array, the center representing a point of symmetry of the array.

23. The system according to claim 1, wherein the plurality of survey reflectors are arranged in a hexagonal array pattern.

24. The system according to claim 1, each survey reflectors of the plurality of survey reflectors have a surface configured for receiving an incoming light beam, wherein the surface is substantially circular.

25. The system according to claim 1, wherein the plurality of survey reflectors are realized by a plurality of survey prisms.

26. The system according to claim 1, wherein the plurality of survey reflectors are realized by a plurality of hollow mirrors each having a center point.

27. The system according to claim 1,
  wherein the plurality of survey reflectors include between 13 to 35 reflectors.

* * * * *